United States Patent

(12) United States Patent
Ota

(10) Patent No.: US 11,604,339 B2
(45) Date of Patent: Mar. 14, 2023

(54) ZOOM LENS AND IMAGING APPARATUS

(71) Applicant: FUJIFILM Corporation, Tokyo (JP)

(72) Inventor: Motoari Ota, Saitama (JP)

(73) Assignee: FUJIFILM Corporation, Tokyo (JP)

(\*) Notice: Subject to any disclaimer, the term of this patent is extended or adjusted under 35 U.S.C. 154(b) by 285 days.

(21) Appl. No.: 17/016,790

(22) Filed: Sep. 10, 2020

(65) Prior Publication Data

US 2021/0088764 A1 Mar. 25, 2021

(30) Foreign Application Priority Data

Sep. 20, 2019 (JP) .............................. JP2019-171642

(51) Int. Cl.
| | | |
|---|---|---|
| G02B 15/14 | (2006.01) | |
| G02B 15/16 | (2006.01) | |
| G02B 15/22 | (2006.01) | |
| G02B 27/64 | (2006.01) | |
| G02B 15/24 | (2006.01) | |

(52) U.S. Cl.
CPC ..... *G02B 15/145129* (2019.08); *G02B 15/16* (2013.01); *G02B 15/22* (2013.01); *G02B 27/646* (2013.01); *G02B 15/24* (2013.01)

(58) Field of Classification Search
CPC ........................ G02B 15/145129; G02B 15/22; G02B 15/24; G02B 27/0025; G02B 27/646
See application file for complete search history.

(56) References Cited

U.S. PATENT DOCUMENTS

| | | | |
|---|---|---|---|
| 5,561,560 A | 10/1996 | Tsutsumi | |
| 2015/0015966 A1* | 1/2015 | Ida | G02B 15/177 |
| | | | 359/683 |
| 2015/0309292 A1 | 10/2015 | Aoi et al. | |
| 2018/0203214 A1* | 7/2018 | Sakamoto | G02B 15/1451 |
| 2019/0265447 A1 | 8/2019 | Hori et al. | |
| 2019/0265451 A1 | 8/2019 | Shimomura et al. | |
| 2020/0004000 A1* | 1/2020 | Ikeda | G02B 13/02 |
| 2020/0158997 A1 | 5/2020 | Hori et al. | |

(Continued)

FOREIGN PATENT DOCUMENTS

| | | |
|---|---|---|
| JP | H07-248449 A | 9/1995 |
| JP | 2017-215406 A | 12/2017 |
| JP | 2018-116182 A | 7/2018 |

(Continued)

OTHER PUBLICATIONS

Schott Optical Glass Material Data Sheets (Year: 2007).*

(Continued)

*Primary Examiner* — Kristina M Deherrera
(74) *Attorney, Agent, or Firm* — Studebaker & Brackett PC

(57) ABSTRACT

A zoom lens consists of, in order from an object side, a positive first lens group, a negative second lens group, a positive third lens group, a positive fourth lens group, and a positive fifth lens group. During zooming, the first lens group and the fifth lens group are not moved, and the second lens group, the third lens group, and the fourth lens group are moved. The first lens group consists of one negative lens and five positive lenses in order from the object side to an image side. Predetermined conditional expressions related to a refractive index, an Abbe number, and a partial dispersion ratio of the negative lens of the first lens group are satisfied.

18 Claims, 12 Drawing Sheets

(56) References Cited

U.S. PATENT DOCUMENTS

2021/0033833 A1* 2/2021 Ogawa ........... G02B 15/145129

FOREIGN PATENT DOCUMENTS

| | | |
|---|---|---|
| JP | 2019-148758 A | 9/2019 |
| JP | 2019-148760 A | 9/2019 |
| JP | 2020-012870 A | 1/2020 |
| JP | 2020-085934 A | 6/2020 |
| JP | 2020-085935 A | 6/2020 |
| WO | 2014/073187 A1 | 5/2014 |

OTHER PUBLICATIONS

"Notice of Reasons for Refusal" Office Action issued in JP 2019-171642; mailed by the Japanese Patent Office dated Jul. 5, 2022.

* cited by examiner

EXAMPLE 1

EXAMPLE 1

EXAMPLE 1

EXAMPLE 2

EXAMPLE 2

EXAMPLE 3

EXAMPLE 3

EXAMPLE 4

EXAMPLE 4

EXAMPLE 5

EXAMPLE 5

ZOOM LENS AND IMAGING APPARATUS

CROSS-REFERENCE TO RELATED APPLICATIONS

The present application claims priority under 35 U.S.C. § 119 to Japanese Patent Application No. 2019-171642, filed on Sep. 20, 2019. The above application is hereby expressly incorporated by reference, in its entirety, into the present application.

BACKGROUND OF THE INVENTION

1. Field of the Invention

The technology of the present disclosure relates to a zoom lens and an imaging apparatus.

2. Description of the Related Art

In the related art, a zoom lens consisting of a plurality of lens groups of which mutual intervals are changed during zooming has been suggested as a lens system usable in a broadcasting camera, a movie imaging camera, a digital camera, and the like.

For example, JP2018-116182A discloses a zoom lens including, in order from an object side to an image side, a first lens group that has a positive refractive power and is moved in the case of focusing and is not moved for zooming, a second lens group that has a negative refractive power and is moved to the image side in the case of zooming from a wide angle end to a telephoto end, and a relay lens group that is arranged closest to the image side and is not moved for zooming. JP2017-215406A discloses a zoom lens composed of, in order from an object side to an image side, a first lens group that has a positive refractive power and is not moved for zooming, a second lens group that has a negative refractive power and is moved to the image side in the case of zooming, a lens group that is moved in the case of zooming, an aperture stop, and a lens group that is not moved for zooming.

SUMMARY OF THE INVENTION

One embodiment according to the technology of the present disclosure provides a zoom lens that can achieve size reduction and a high magnification and has favorable optical characteristics, and an imaging apparatus comprising the zoom lens.

A zoom lens according to one aspect of the technology of the present disclosure consists of, in order from an object side to an image side, a first lens group that has a positive refractive power and is fixed with respect to an image surface during zooming, a second lens group that has a negative refractive power and is moved along an optical axis during zooming, a third lens group that has a positive refractive power and is moved along the optical axis during zooming, a fourth lens group that has a positive refractive power and is moved along the optical axis during zooming, and a fifth lens group that has a positive refractive power and is fixed with respect to the image surface during zooming, in which all intervals between adjacent lens groups are changed during zooming, the first lens group consists of one negative lens and five positive lenses in order from the object side to the image side, and in a case where a refractive index of the negative lens of the first lens group with respect to d line is denoted by Nd1, a d line-based Abbe number of the negative lens of the first lens group is denoted by vd1, and a partial dispersion ratio of the negative lens of the first lens group between g line and F line is denoted by θgF1, Conditional Expressions (1), (2), and (3) below are satisfied.

$$1.8 < Nd1 < 1.85 \quad (1)$$

$$38 < vd1 < 46 \quad (2)$$

$$0.55 < \theta gF1 < 0.58 \quad (3)$$

It is preferable that the zoom lens of the aspect further satisfies at least one of Conditional Expression (1-1), (2-1), or (3-1) below.

$$1.81 < Nd1 < 1.85 \quad (1-1)$$

$$40 < vd1 < 45 \quad (2-1)$$

$$0.55 < \theta gF1 < 0.57 \quad (3-1)$$

It is preferable that the second lens group includes at least one positive lens, and in a case where a maximum value of a d line-based Abbe number of all positive lenses included in the second lens group is denoted by vd2p, it is preferable to satisfy Conditional Expression (4) below, and it is more preferable to satisfy Conditional Expression (4-1) below.

$$65 < vd2p < 110 \quad (4)$$

$$70 < vd2p < 106 \quad (4-1)$$

In a state where an object at infinity is focused, in a case where a focal length of the first lens group is denoted by fG1, and a focal length of the negative lens of the first lens group is denoted by fL1, it is preferable to satisfy Conditional Expression (5) below, and it is more preferable to satisfy Conditional Expression (5-1) below.

$$-0.9 < fG1/fL1 < -0.65 \quad (5)$$

$$-0.8 < fG1/fL1 < -0.65 \quad (5-1)$$

It is preferable that the first lens group consists of, in order from the object side to the image side, a first a lens group that is fixed with respect to the image surface during focusing, a first b lens group that has a positive refractive power and is moved along the optical axis in during focusing, and a first c lens group that has a positive refractive power and is moved along the optical axis by changing a mutual interval between the first b lens group and the first c lens group during focusing. In this case, it is preferable that the first a lens group consists of one negative lens and two positive lenses in order from the object side to the image side, the first b lens group consists of two positive lenses, and the first c lens group consists of one positive lens. In a state where an object at infinity is focused, in a case where a focal length of the first lens group is denoted by fG1, and a focal length of the first a lens group is denoted by fG1a, it is preferable to satisfy Conditional Expression (6) below, and it is more preferable to satisfy Conditional Expression (6-1) below.

$$-0.035 < fG1/fG1a < 0.045 \quad (6)$$

$$-0.02 < fG1/fG1a < 0.02 \quad (6-1)$$

It is preferable that during zooming from a wide angle end to a telephoto end in a state where an object at infinity is focused, a third and fourth combined lens group obtained by combining the third lens group and the fourth lens group, and the second lens group simultaneously pass through respective points at which lateral magnifications are −1, and the third lens group is moved to the object side at all times.

In this case, in a state where an object at infinity is focused, in a case where a focal length of the third and fourth combined lens group at the telephoto end is denoted by fG34t, and a focal length of the second lens group is denoted by fG2, it is preferable to satisfy Conditional Expression (7) below, and it is more preferable to satisfy Conditional Expression (7-1) below.

$$-4 < fG34t/fG2 < -3 \quad (7)$$

$$-3.6 < fG34t/fG2 < -3.1 \quad (7\text{-}1)$$

In a state where an object at infinity is focused, in a case where a focal length of the third lens group is denoted by fG3, and a focal length of the second lens group is denoted by fG2, it is preferable to satisfy Conditional Expression (8) below, and it is more preferable to satisfy Conditional Expression (8-1) below.

$$-10 < fG3/fG2 < -4 \quad (8)$$

$$-9 < fG3/fG2 < -5 \quad (8\text{-}1)$$

In a state where an object at infinity is focused, in a case where a focal length of the first lens group is denoted by fG1, and a focal length of the second lens group is denoted by fG2, it is preferable to satisfy Conditional Expression (9) below.

$$-12 < fG1/fG2 < -8 \quad (9)$$

It is preferable that the fifth lens group includes a vibration proof group that is moved in a direction intersecting with the optical axis during image shake correction.

An imaging apparatus according to another aspect of the technology of the present disclosure comprises the zoom lens of the aspect of the present disclosure.

In the present specification, "consist of" or "consisting of" means that a lens that substantially does not have a refractive power, and optical elements such as a stop, a filter, and a cover glass other than a lens, mechanism parts such as a lens flange, a lens barrel, an imaging element, and a camera shake correction mechanism, and the like may be included besides illustrated constituents.

In the present specification, a "~ group having a positive refractive power" means that the entire group has a positive refractive power. Similarly, a "~ group having a negative refractive power" means that the entire group has a negative refractive power. A "lens having a positive refractive power" and a "positive lens" have the same meaning. A "lens having a negative refractive power" and a "negative lens" have the same meaning. A "~ lens group" and the "vibration proof group" are not limited to a configuration consisting of a plurality of lenses and may be configured to consist of only one lens.

A compound aspherical lens (a lens in which a spherical lens and a film of an aspherical shape formed on the spherical lens are configured as a single unit and function as one aspherical lens as a whole) is not regarded as a cemented lens and is handled as one lens. The sign of a refractive power and a surface shape related to a lens including an aspherical surface are considered in a paraxial region unless otherwise specified.

The "focal length" used in the conditional expressions is a paraxial focal length. The values used in the conditional expressions except the partial dispersion ratio are values in a case based on d line in a state where the object at infinity is focused. A partial dispersion ratio θgF of a certain lens between g line and F line is defined as θgF=(Ng−NF)/(NF−NC) in a case where the refractive indexes of the lens with respect to g line, F line, and C line are denoted by Ng, NF, and NC, respectively. In the present specification, "d line", "C line", "F line", and "g line" are bright lines. The wavelength of d line is 587.56 nanometers (nm). The wavelength of C line is 656.27 nanometers (nm). The wavelength of F line is 486.13 nanometers (nm). The wavelength of g line is 435.84 nanometers (nm).

DESCRIPTION OF THE PREFERRED EMBODIMENTS

Figure 1:
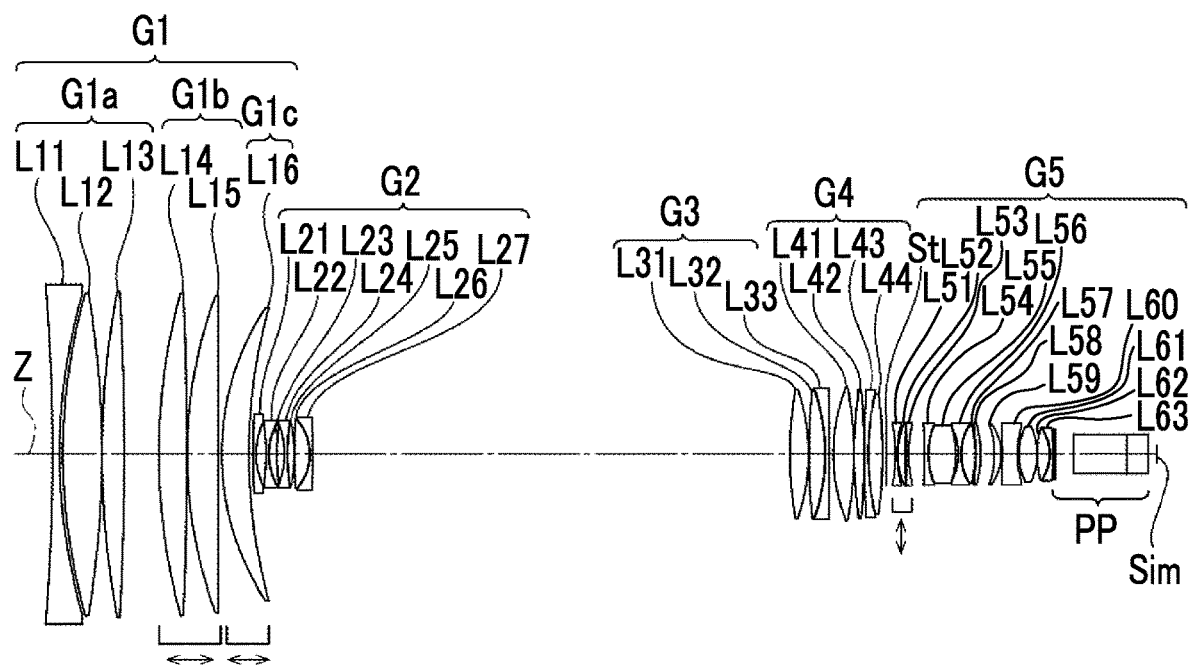
FIG. 1 is a diagram corresponding to a zoom lens of Example 1 of the present disclosure and illustrating a cross-sectional view of a configuration and a movement trajectory of a zoom lens according to one embodiment of the present disclosure.
Figure 1:
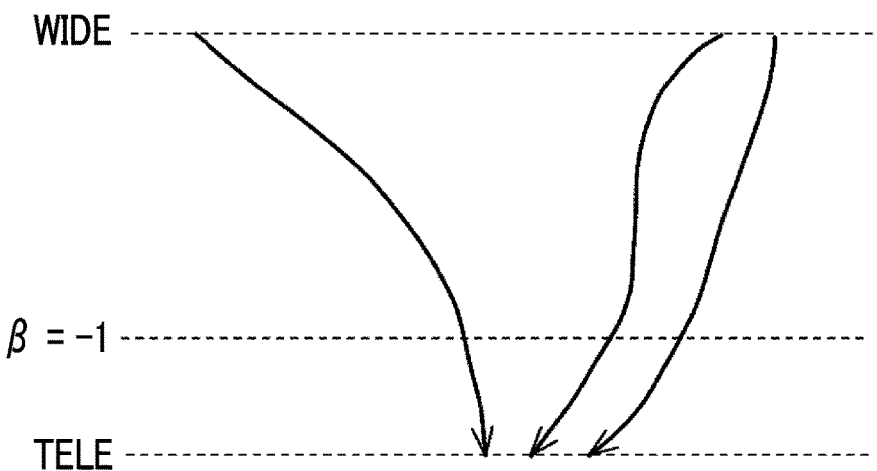
Figure 2:
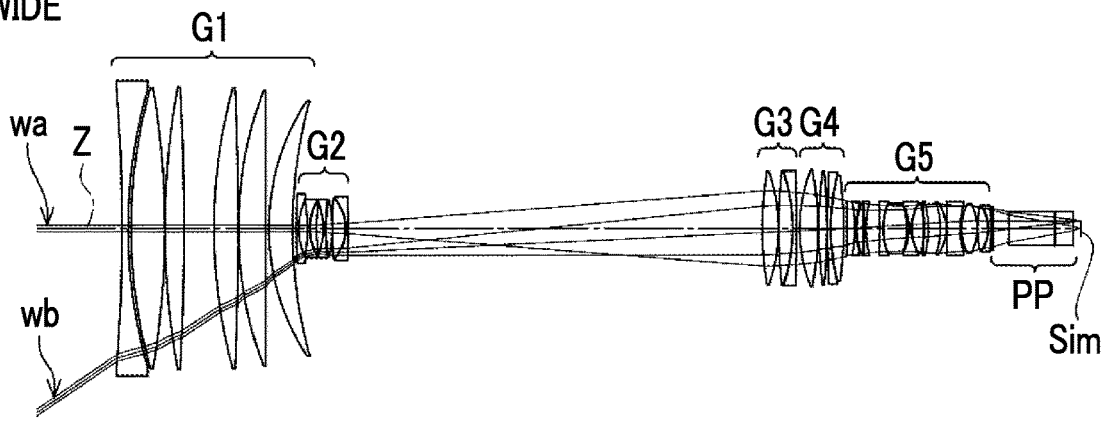
FIG. 2 is a cross-sectional view illustrating a configuration of the zoom lens and luminous flux illustrated in FIG. 1.
Figure 2:
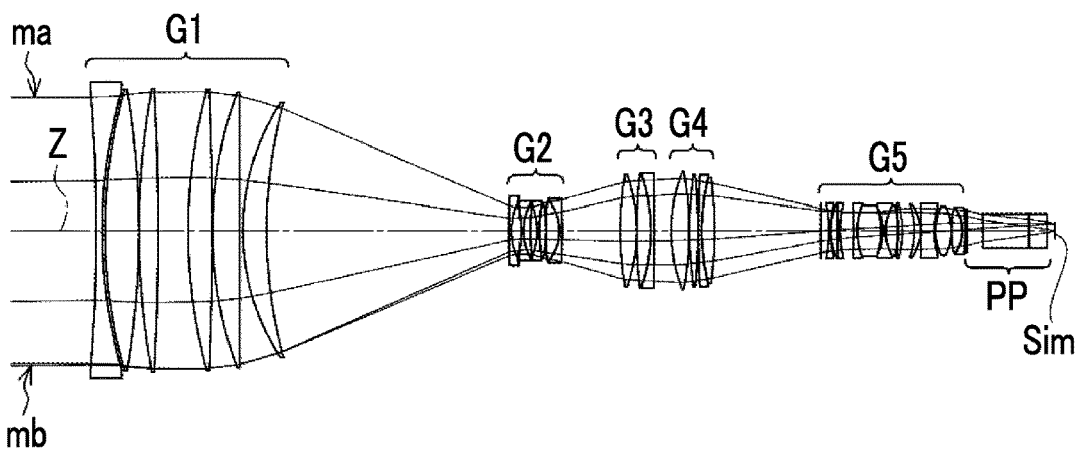
Figure 2:
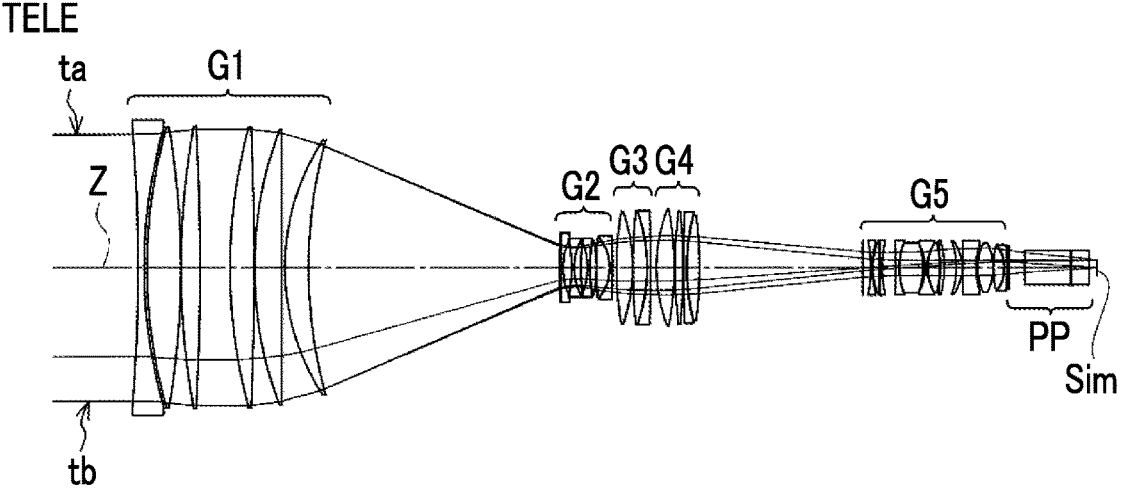

Hereinafter, one example of an embodiment according to the technology of the present disclosure will be described with reference to the drawings. FIG. 1 is a diagram illustrating a cross-sectional view of a configuration and a movement trajectory at a wide angle end of a zoom lens according to one embodiment of the present disclosure. FIG. 2 is a cross-sectional view illustrating the configuration of the zoom lens and luminous flux. Examples illustrated in FIG. 1 and FIG. 2 correspond to a zoom lens of Example 1 described later. In the cross-sectional views of FIG. 1 and FIG. 2, a state where an object at infinity is focused is illustrated. A left side is an object side, and a right side is an image side. In FIG. 2, a wide angle end state is illustrated in an upper part denoted by "WIDE", a middle focal length state is illustrated in a middle part denoted by "MIDDLE", and a telephoto end state is illustrated in a lower part denoted by "TELE". In FIG. 2, axial luminous flux wa and luminous flux wb of the maximum angle of view in the wide angle end state, axial luminous flux ma and luminous flux mb of the maximum angle of view in the middle focal length state, and axial luminous flux to and luminous flux tb of the maximum angle of view in the telephoto end state are illustrated as luminous flux. Hereinafter, the zoom lens according to one embodiment of the present disclosure will be described mainly with reference to FIG. 1.

In FIG. 1, an example in which an optical member PP in which an incidence surface and an emission surface are parallel is arranged between the zoom lens and an image surface Sim is illustrated by assuming application of the zoom lens to an imaging apparatus. The optical member PP is a member that is assumed to correspond to various filters, a cover glass, a prism, and the like. For example, the various filters include a low-pass filter, an infrared cut filter, and a filter cutting a specific wavelength range. The optical member PP is a member not having a refractive power, and the optical member PP can be configured not to be included.

The zoom lens consists of, in order from the object side to the image side along an optical axis Z, the first lens group G1 having a positive refractive power, the second lens group G2 having a negative refractive power, the third lens group G3 having a positive refractive power, the fourth lens group G4 having a positive refractive power, and the fifth lens group G5 having a positive refractive power. During zooming, the first lens group G1 and the fifth lens group G5 are fixed with respect to the image surface Sim, and the second lens group G2, the third lens group G3, and the fourth lens group G4 are moved along the optical axis Z. All intervals between adjacent lens groups are changed. By having the above configuration that consists of five lens groups between which the intervals are changed during zooming, and in which a lens group having a positive refractive power is arranged closest to the object side, an advantageous configuration for both size reduction and a high magnification is achieved. In addition, by having the configuration in which the first lens group G1 and the fifth lens group G5 are fixed during zooming, the distance from a lens surface closest to the object side to a lens surface closest to the image side is not changed during zooming, and a change in centroid of a lens system can be reduced. Thus, convenience of use during imaging can be increased.

In FIG. 1, the movement trajectory of each lens group during zooming from a wide angle end to a telephoto end is schematically illustrated by a solid arrow below each of the second lens group G2, the third lens group G3, and the fourth lens group G4. In addition, in FIG. 1, the wide angle end and the telephoto end corresponding to the starting point and the ending point of the movement trajectory, respectively, are denoted by "WIDE" and "TELE", respectively.

Each lens group in the example in FIG. 1 is composed of lenses described below. That is, the first lens group G1 consists of six lenses of lenses L11 to L16 in order from the object side to the image side. The second lens group G2 consists of seven lenses of lenses L21 to L27 in order from the object side to the image side. The third lens group G3 consists of three lenses of lenses L31 to L33 in order from the object side to the image side. The fourth lens group G4 consists of four lenses of lenses L41 to L44 in order from the object side to the image side. The fifth lens group G5 consists of an aperture stop St and 13 lenses of lenses L51 to L63 in order from the object side to the image side. The aperture stop St in FIG. 1 does not illustrate a shape and illustrates a position in an optical axis direction.

The first lens group G1 is configured to consist of one negative lens and five positive lenses in order from the object side to the image side. By arranging the negative lens closest to the object side, an advantage of a wide angle is achieved. While the refractive power of each of the negative and positive lenses needs to be increased in order to suppress first-order chromatic aberration, doing so causes a large amount of spherical aberration. Therefore, by configuring the first lens group G1 to include five positive lenses, occurrence of the spherical aberration can be suppressed by dividing the positive refractive power.

The material of the negative lens of the first lens group G1 is selected as described below. In a case where the d line refractive index of the negative lens of the first lens group G1 is denoted by Nd1, it is configured to satisfy Conditional Expression (1) below. By satisfying Conditional Expression (1) not to be below the lower limit thereof, an advantage of suppressing distortion is achieved. By satisfying Conditional Expression (1) not to be above the upper limit thereof, a material having a small partial dispersion ratio between g line and F line is easily selected, and an advantage of suppressing second-order chromatic aberration is achieved. Furthermore, in a case where it is configured to satisfy Conditional Expression (1-1) below, more favorable characteristics can be achieved. In a case where it is configured to satisfy Conditional Expression (1-2), still more favorable characteristics can be achieved.

$$1.8 < Nd1 < 1.85 \tag{1}$$

$$1.81 < Nd1 < 1.85 \tag{1-1}$$

$$1.81 < Nd1 < 1.84 \tag{1-2}$$

In a case where the d line-based Abbe number of the negative lens of the first lens group G1 is denoted by νd1, it is configured to satisfy Conditional Expression (2) below. By satisfying Conditional Expression (2) not to be below the lower limit thereof, a material having a small partial dispersion ratio between g line and F line is easily selected, and an advantage of suppressing the second-order chromatic aberration is achieved. By satisfying Conditional Expression (2) not to be above the upper limit thereof, an advantage of suppressing the first-order chromatic aberration is achieved. Furthermore, in a case where it is configured to satisfy Conditional Expression (2-1) below, more favorable characteristics can be achieved. In a case where it is configured to satisfy Conditional Expression (2-2) below, still more favorable characteristics can be achieved.

$$38 < νd1 < 46 \tag{2}$$

$$40 < νd1 < 45 \tag{2-1}$$

$$42 < νd1 < 44 \tag{2-2}$$

In a case where the partial dispersion ratio of the negative lens of the first lens group G1 between g line and F line is denoted by θgF1, it is configured to satisfy Conditional Expression (3) below. By satisfying Conditional Expression (3) not to be below the lower limit thereof, a material having a small d line-based Abbe number is easily selected, and an advantage of suppressing the first-order chromatic aberration is achieved. By satisfying Conditional Expression (3) not to be above the upper limit thereof, an advantage of suppressing the second-order chromatic aberration is achieved. Furthermore, in a case where it is configured to satisfy Conditional Expression (3-1) below, more favorable characteristics can be achieved. In a case where it is configured to satisfy Conditional Expression (3-2) below, still more favorable characteristics can be achieved.

$$0.55 < θgF1 < 0.58 \tag{3}$$

$$0.55 < θgF1 < 0.57 \tag{3-1}$$

$$0.56 < θgF1 < 0.57 \tag{3-2}$$

Next, a preferred configuration of the zoom lens according to the embodiment of the technology of the present disclosure will be described. In a case where the focal length of the first lens group G1 is denoted by fG1 and the focal length of the negative lens of the first lens group G1 is denoted by fL1 in a state where the object at infinity is focused, it is preferable to satisfy Conditional Expression (5) below. By satisfying Conditional Expression (5) not to be below the lower limit thereof, the refractive power of the negative lens of the first lens group G1 is not excessively increased. Thus, an advantage of suppressing negative distortion at the wide angle end is achieved. By satisfying Conditional Expression (5) not to be above the upper limit thereof, the refractive power of the negative lens of the first lens group G1 is not excessively decreased. Thus, an advantage of correcting axial chromatic aberration and correcting the spherical aberration is achieved. Furthermore, in a case where it is configured to satisfy Conditional Expression (5-1) below, more favorable characteristics can be achieved. In a case where it is configured to satisfy Conditional Expression (5-2) below, still more favorable characteristics can be achieved.

$$-0.9 < fG1/fL1 < -0.65 \tag{5}$$

$$-0.8 < fG1/fL1 < -0.65 \tag{5-1}$$

$$-0.75 < fG1/fL1 < -0.65 \tag{5-2}$$

It is preferable that the first lens group G1 is configured to consist of, in order from the object side to the image side, a first a lens group G1a that is fixed with respect to the image surface Sim during focusing, a first b lens group G1b that has a positive refractive power and is moved along the optical axis Z during focusing, and a first c lens group G1c that has a positive refractive power and is moved along the optical axis Z by changing a mutual interval between the first b lens group G1b and the first c lens group G1c during focusing. By having such a configuration, a change in spherical aberration on a telephoto side during focusing can be easily reduced.

For example, in the zoom lens in FIG. 1, the first a lens group G1a consists of the lenses L11 to L13. The first b lens group G1b consists of the lenses L14 and L15. The first c lens group G1c consists of the lens L16. A horizontal bidirectional arrow shown below each of the first b lens group G1b and the first c lens group G1c in FIG. 1 indicates that the first b lens group G1b and the first c lens group G1c are lens groups (hereinafter, referred to as the focus lens groups) that are moved during focusing.

As illustrated in FIG. 1, it is preferable to configure that the first a lens group G1a consists of one negative lens and two positive lenses in order from the object side to the image side, the first b lens group G1b consists of two positive lenses, and the first c lens group G1c consists of one positive lens. In such a case, by arranging the negative lens on the side of the first a lens group G1a closest to the object side, an angle between a principal ray toward the image side from the negative lens and the optical axis Z can be further decreased. Thus, an advantage of a wide angle is achieved. In addition, by arranging the positive lens consecutive to this negative lens, an advantage of suppressing residual aberration of the first a lens group G1a and suppressing a change in spherical aberration on a telephoto side accompanied by a change in object distance is achieved. Furthermore, by including two positive lenses in the first a lens group G1a, the above effect can be increased.

For the first b lens group G1b and the first c lens group G1c, a change in spherical aberration on the telephoto side during focusing can be further reduced by dividing the positive refractive power of the focus lens groups using total three positive lenses of the first b lens group G1b and the first c lens group G1c. In addition, by having three positive lenses for dividing the positive refractive power of the focus lens groups, the effective diameter of the first lens group G1 can be further decreased compared to the case of having four or more positive lenses. By distributing two positive lenses in the first b lens group G1b and distributing one positive lens in the first c lens group G1c among the three positive lenses, the refractive power of the first b lens group G1b can be set to be higher than the refractive power of the first c lens group G1c. Accordingly, the first b lens group G1b can have a main focusing effect, and the first c lens group G1c can have an effect of correcting a field curvature.

In the configuration in which the first lens group G1 consists of the first a lens group G1a, the first b lens group G1b, and the first c lens group G1c, in a case where the focal length of the first lens group G1 is denoted by fG1 and the focal length of the first a lens group G1a is denoted by fG1a in a state where the object at infinity is focused, it is preferable to satisfy Conditional Expression (6) below. By satisfying Conditional Expression (6), an advantage of suppressing a change in spherical aberration at the telephoto end during focusing is achieved. Furthermore, in a case where it is configured to satisfy Conditional Expression (6-1) below, more favorable characteristics can be achieved. In a case where it is configured to satisfy Conditional Expression (6-2) below, still more favorable characteristics can be achieved.

$$-0.035 < fG1/fG1a < 0.045 \tag{6}$$

$$-0.02 < fG1/fG1a < 0.02 \tag{6-1}$$

$$-0.006 < fG1/fG1a < 0.003 \tag{6-2}$$

In a case where the focal length of the first lens group G1 is denoted by fG1 and the focal length of the second lens group G2 is denoted by fG2 in a state where the object at infinity is focused, it is preferable to satisfy Conditional Expression (9) below. By satisfying Conditional Expression (9) not to be below the lower limit thereof, the refractive power of the first lens group G1 is not excessively decreased. Thus, the first lens group G1 can form an image point closer to the object side. Generally, the zoom stroke (movement range during zooming) of the second lens group G2 is set to be within a range from the surface of the first lens group G1 closest to the image side to the image point formed by the first lens group G1. Thus, by satisfying Conditional Expression (9) not to be below the lower limit thereof, an increase in zoom stroke of the second lens group G2 can be suppressed. Accordingly, both a high magnification and reduction of a total length are easily achieved. Alternatively, by satisfying Conditional Expression (9) not to be below the lower limit thereof, the refractive power of the second lens group G2 is not excessively increased. Thus, an advantage of suppressing a change in various types of aberration such as the spherical aberration during zooming is achieved. By satisfying Conditional Expression (9) not to be above the upper limit thereof, the refractive power of the first lens group G1 is not excessively increased. Thus, since the first lens group G1 can form the image point closer to the image side, the zoom stroke of the second lens group G2 is not excessively decreased. Accordingly, since rays can be smoothly curved, both a high magnification and high characteristics are easily achieved. Alternatively, by satisfying Conditional Expression (9) not to be above the upper limit thereof, the refractive power of the second lens group G2 is not excessively decreased. Thus, both a high magnification and reduction of the total length are easily achieved. Furthermore, in a case where it is configured to satisfy Conditional Expression (9-1) below, more favorable characteristics can be achieved. In a case where it is configured to satisfy Conditional Expression (9-2) below, still more favorable characteristics can be achieved.

$$-12 < fG1/fG2 < -8 \quad (9)$$

$$-11 < fG1/fG2 < -9 \quad (9\text{-}1)$$

$$-10.5 < fG1/fG2 < -9.5 \quad (9\text{-}2)$$

It is preferable that the second lens group G2 includes at least one positive lens and Conditional Expression (4) below is satisfied in a case where the maximum value of the d line-based Abbe number of all positive lenses included in the second lens group G2 is denoted by vd2p. By satisfying Conditional Expression (4) not to be below the lower limit thereof, lateral chromatic aberration of a short wavelength occurring on a positive side at the wide angle end by the first lens group G1 can be corrected by the second lens group G2. By satisfying Conditional Expression (4) not to be above the upper limit thereof, the refractive index of the positive lens of the second lens group G2 of which the d line-based Abbe number is vd2p is not excessively decreased. Thus, the absolute value of the curvature of the positive lens is not excessively increased, and an increase in thickness can be suppressed. Accordingly, since an advantage of securing the zoom stroke is achieved, an advantage of a high magnification is achieved. Furthermore, in a case where it is configured to satisfy Conditional Expression (4-1) below, more favorable characteristics can be achieved. In a case where it is configured to satisfy Conditional Expression (4-2) below, still more favorable characteristics can be achieved.

$$65 < vd2p < 110 \quad (4)$$

$$70 < vd2p < 106 \quad (4\text{-}1)$$

$$80 < vd2p < 103 \quad (4\text{-}2)$$

It is preferable that the third lens group G3 is configured to consist of a single lens that is a positive lens, and a cemented lens obtained by cementing two lenses in which any one is a positive lens and the other is a negative lens. The cemented lens obtained by cementing two lenses in which any one is a positive lens and the other is a negative lens may be a cemented lens obtained by cementing the positive lens and the negative lens in order from the object side or may be a cemented lens obtained by cementing the negative lens and the positive lens in order from the object side. By including such a cemented lens in the third lens group G3, a change in axial chromatic aberration during zooming can be favorably suppressed. In addition, by providing the third lens group G3 with a three-lens composition, the zoom stroke can be secured by saving space. Thus, both a high magnification and reduction of the total length are easily achieved.

In a case where the focal length of the third lens group G3 is denoted by fG3 and the focal length of the second lens group G2 is denoted by fG2 in a state where the object at infinity is focused, it is preferable to satisfy Conditional Expression (8) below. By satisfying Conditional Expression (8) not to be below the lower limit thereof, the refractive power of the second lens group G2 is not excessively increased. Thus, an advantage of suppressing a change in various types of aberration such as the spherical aberration during zooming is achieved. Alternatively, since the refractive power of the third lens group G3 is not excessively decreased, an increase in zoom stroke of the third lens group G3 can be suppressed, and both a high magnification and reduction of the total length are easily achieved. By satisfying Conditional Expression (8) not to be above the upper limit thereof, the refractive power of the second lens group G2 is not excessively decreased. Thus, an increase in zoom stroke of the second lens group G2 can be suppressed, and both a high magnification and reduction of the total length are easily achieved. Alternatively, since the refractive power of the third lens group G3 is not excessively increased, an advantage of suppressing a change in various types of aberration during zooming is achieved. Furthermore, in a case where it is configured to satisfy Conditional Expression (8-1) below, more favorable characteristics can be achieved. In a case where it is configured to satisfy Conditional Expression (8-2) below, still more favorable characteristics can be achieved.

$$-10 < fG3/fG2 < -4 \quad (8)$$

$$-9 < fG3/fG2 < -5 \quad (8\text{-}1)$$

$$-8 < fG3/fG2 < -6 \quad (8\text{-}2)$$

During zooming from the wide angle end to the telephoto end in a state where the object at infinity is focused, it is preferable that a third and fourth combined lens group formed by combining the third lens group G3 and the fourth lens group G4, and the second lens group G2 simultaneously pass through respective points at which lateral magnifications are −1 and the third lens group G3 is moved to the object side at all times. In such a case, since the zooming efficiency of the third and fourth combined lens group is high, the zoom lens is appropriate for a high magnification. In the drawing of the movement trajectory in FIG. 1, a zoom position at which the lateral magnification of the third and fourth combined lens group and the lateral magnification of the second lens group G2 are −1 is indicated by "β=−1".

In the configuration in which the third and fourth combined lens group and the second lens group G2 simultaneously pass through respective points at which lateral magnifications are −1, in a case where the focal length of the third and fourth combined lens group at the telephoto end is denoted by fG34t and the focal length of the second lens group G2 is denoted by fG2 in a state where the object at infinity is focused, it is preferable to satisfy Conditional Expression (7) below. By satisfying Conditional Expression (7) not to be below the lower limit thereof, the refractive power of the second lens group G2 is not excessively increased. Thus, an advantage of suppressing a change in various types of aberration such as the spherical aberration during zooming is achieved. By satisfying Conditional Expression (7) not to be above the upper limit thereof, the refractive power of the third and fourth combined lens group is not excessively increased. Thus, an advantage of suppressing deterioration of the spherical aberration at the telephoto end is achieved. Furthermore, in a case where it is configured to satisfy Conditional Expression (7-1) below, more favorable characteristics can be achieved. In a case where it is configured to satisfy Conditional Expression (7-2) below, still more favorable characteristics can be achieved.

$$-4 < fG34t/fG2 < -3 \quad (7)$$

$$-3.6 < fG34t/fG2 < -3.1 \quad (7\text{-}1)$$

$$-3.3 < fG34t/fG2 < -3.1 \quad (7\text{-}2)$$

It is preferable that the aperture stop St is arranged on the side of the fifth lens group G5 closest to the object side. In such a case, the effective diameter of the lens of the first lens group G1 closest to the object side is easily decreased compared to a case where the aperture stop St is arranged on the image side from the side of the fifth lens group G1 closest to the object side.

It is preferable that the fifth lens group G5 comprises a vibration proof group that is moved in a direction intersecting with the optical axis Z during image shake correction. Since the fifth lens group G5 is not moved during zooming, the way the principal ray passes through the fifth lens group G5 during zooming is not changed. Thus, by comprising the vibration proof group in the fifth lens group G5, performance of the image shake correction can be favorably secured over the entire zoom range. In the example in FIG. 1, the vibration proof group consists of three lenses of the lenses L51 to L53. Vertical bidirectional arrows shown below the lenses L51 to L53 in FIG. 1 indicate that the lenses L51 to L53 are the vibration proof group.

It is preferable to configure that the aperture stop St is arranged on the side of the fifth lens group G5 closest to the object side and the vibration proof group is the lens group of the fifth lens group G5 closest to the object side. In such a case, the height of an outer edge ray of the axial luminous flux is approximated the height of an outer edge ray of non-axial luminous flux. Thus, a change in aberration during image shake correction from an angle of view of zero to a large angle of view can be evenly suppressed.

The example illustrated in FIG. 1 is one example, and the number of lenses constituting each lens group can be a number different from the example illustrated in FIG. 1.

The above preferred configurations and available configurations can be randomly combined and preferably, are appropriately selectively employed depending on required specifications. According to the technology of the present disclosure, a zoom lens achieving size reduction and a high magnification and having favorable optical characteristics can be implemented. The "high magnification" here means that a zoom magnification is greater than or equal to a power of 100.

Next, examples of the numerical value of the zoom lens according to the embodiment of the present disclosure will be described.

Example 1

A configuration and a movement trajectory of the zoom lens of Example 1 are illustrated in FIG. 1, and the method and configuration of illustration are described above. Thus, a duplicate description will be partially omitted here. The zoom lens of Example 1 consists of, in order from the object side to the image side, the first lens group G1 having a positive refractive power, the second lens group G2 having a negative refractive power, the third lens group G3 having a positive refractive power, the fourth lens group G4 having a positive refractive power, and the fifth lens group G5 having a positive refractive power. During zooming, the first lens group G1 and the fifth lens group G5 are fixed with respect to the image surface Sim, and the second lens group G2, the third lens group G3, and the fourth lens group G4 are moved along the optical axis Z by changing the intervals between the adjacent lens groups. The first lens group G1 consists of the first a lens group G1a, the first b lens group G1b, and the first c lens group G1c in order from the object side to the image side. During focusing, the first b lens group G1b and the first c lens group G1c are moved along the optical axis Z by changing the mutual interval, and all of the other lens groups are fixed with respect to the image surface Sim. The first a lens group G1a consists of three lenses. The first b lens group G1b consists of two lenses. The first c lens group G1c consists of one lens. The second lens group G2 consists of seven lenses. The third lens group G3 consists of three lenses. The fourth lens group G4 consists of four lenses. The fifth lens group G5 consists of the aperture stop St and 13 lenses in order from the object side to the image side. The vibration proof group consists of three lenses of the first, second, and third lenses of the fifth lens group G5 from the object side. Above is the summary of the zoom lens of Example 1.

For the zoom lens of Example 1, fundamental lens data is shown in Table 1A and Table B, specifications and variable surface intervals are shown in Table 2, and aspherical coefficients are shown in Table 3. The fundamental lens data is separately displayed in two tables of Table 1A and Table 1B in order to avoid one long table. Table 1A shows the first lens group G1 to the fourth lens group G4, and Table 1B shows the fifth lens group G5 and the optical member PP. Table 1A, Table 1B, and Table 2 show data in a state where the object at infinity is focused.

In Table 1A and Table 1B, the field of Sn shows a surface number in a case where the surface closest to the object side is set as a first surface and the number is increased by one at a time toward the image side. The field of R shows the radius of curvature of each surface. The field of D shows a surface interval on the optical axis between each surface and a surface adjacent thereto on the image side. The field of Nd shows the refractive index of each constituent with respect to d line. The field of vd shows the d line-based Abbe number of each constituent. The field of θgF shows the partial dispersion ratio of each constituent between g line and F line.

In Table 1A and Table 1B, the sign of the radius of curvature of a surface having a shape of a convex surface toward the object side is positive, and the sign of the radius of curvature of a surface having a shape of a convex surface toward the image side is negative. In Table 1B, the aperture stop St and the optical member PP are also shown together. In Table 1B, the surface number and a word (St) are written in the field of the surface number of the surface corresponding to the aperture stop St. In Table 1A and Table 1B, a symbol DD[ ] is used for the variable surface interval during zooming. The variable surface interval is shown in the field of D by adding the surface number on the object side of the interval in [ ].

Table 2 shows a zoom magnification Zr, a focal length f, a back focus Bf converted to a distance in air, an F number FNo., a maximum total angle of view 2ω, and the variable surface interval during zooming based on d line. In the field of 2ω, (°) means that the unit is degree. In Table 2, values in the wide angle end state, the middle focal length state, and the telephoto end state are shown in the fields marked with WIDE, MIDDLE, and TELE, respectively.

In the fundamental lens data, the surface number of an aspherical surface is marked with *, and the numerical value of a paraxial radius of curvature is written in the field of the radius of curvature of the aspherical surface. In Table 3, the field of Sn shows the surface number of the aspherical surface, and the fields of KA and Am (m=3, 4, 5, . . . 16) show the numerical value of the aspherical coefficient for each aspherical surface. In the numerical value of the aspherical coefficient in Table 3, "E±n" (n: integer) means "×10±n". KA and Am are aspherical coefficients in an aspherical expression represented by the following expression.

$$Zd = C \times h^2 / \{1 + (1 - KA \times C^2 \times h^2)^{1/2}\} + \Sigma Am \times h^m$$

where

Zd: aspherical depth (length of a perpendicular line drawn from a point on the aspherical surface having a height h to a plane that is in contact with an aspherical vertex and is perpendicular to the optical axis)

h: height (distance from the optical axis to the lens surface)

C: reciprocal of paraxial radius of curvature

KA and Am: aspherical coefficients

In the aspherical expression, Σ means the total sum related to m.

In the data of each table, degree is used as the unit of angle, and mm (millimeter) is used as the unit of length. However, since the optical system can be used even in a case where propositional enlargement or propositional reduction is performed, other appropriate units can also be used. In addition, numerical values that are rounded to a predetermined number of digits are written in each table shown below.

TABLE 1A

Example 1

| Sn | R | D | Nd | vd | θgF |
|---|---|---|---|---|---|
| 1 | −1314.44736 | 4.400 | 1.83481 | 42.73 | 0.56481 |
| 2 | 375.22212 | 2.000 | | | |
| 3 | 380.98802 | 24.220 | 1.43387 | 95.18 | 0.53733 |
| 4 | −619.18405 | 0.120 | | | |
| 5 | 584.09992 | 13.630 | 1.43387 | 95.18 | 0.53733 |
| 6 | −1937.22858 | 21.520 | | | |
| 7 | 396.43760 | 17.340 | 1.43387 | 95.18 | 0.53733 |
| 8 | −2314.51657 | 0.120 | | | |
| 9 | 295.16013 | 19.200 | 1.43700 | 95.10 | 0.53364 |
| 10 | ∞ | 2.160 | | | |
| 11 | 172.64422 | 16.940 | 1.43700 | 95.10 | 0.53364 |
| 12 | 358.69766 | DD[12] | | | |
| *13 | 935.98696 | 1.800 | 1.90366 | 31.31 | 0.59481 |
| 14 | 50.73223 | 6.010 | | | |
| 15 | −135.10191 | 1.800 | 1.87070 | 40.73 | 0.56825 |
| 16 | 40.80800 | 4.960 | 1.43700 | 95.10 | 0.53364 |
| 17 | 150.59356 | 4.690 | | | |
| 18 | −53.04330 | 1.800 | 1.89800 | 34.00 | 0.58703 |
| 19 | 136.79400 | 4.720 | 1.89286 | 20.36 | 0.63944 |
| 20 | −96.87418 | 0.140 | | | |
| 21 | 440.21414 | 9.390 | 1.80518 | 25.45 | 0.61571 |
| 22 | −34.56000 | 1.820 | 1.80400 | 46.53 | 0.55775 |
| 23 | −572.90804 | DD[23] | | | |
| 24 | 246.87583 | 11.640 | 1.49700 | 81.54 | 0.53748 |
| *25 | −123.60927 | 0.120 | | | |
| 26 | 416.68258 | 10.110 | 1.43700 | 95.10 | 0.53364 |
| 27 | −127.84400 | 2.520 | 1.59270 | 35.27 | 0.59363 |
| 28 | −1862.36878 | DD[28] | | | |
| 29 | 120.01989 | 12.810 | 1.43700 | 95.10 | 0.53364 |
| 30 | −225.91503 | 0.120 | | | |
| *31 | 239.27475 | 6.170 | 1.43700 | 95.10 | 0.53364 |
| 32 | −432.65553 | 0.230 | | | |
| 33 | 884.55488 | 2.410 | 1.85883 | 30.00 | 0.59793 |
| 34 | 162.55600 | 9.050 | 1.43700 | 95.10 | 0.53364 |
| 35 | −316.46190 | DD[35] | | | |

TABLE 1B

Example 1

| Sn | R | D | Nd | vd | θgF |
|---|---|---|---|---|---|
| 36 (St) | ∞ | 5.740 | | | |
| 37 | −109.60235 | 1.300 | 1.80100 | 34.97 | 0.58642 |
| 38 | 82.29280 | 0.120 | | | |
| 39 | 49.51289 | 4.610 | 1.84666 | 23.78 | 0.61923 |
| 40 | 354.30763 | 0.860 | | | |
| 41 | −531.15341 | 1.300 | 1.64000 | 60.08 | 0.53704 |
| 42 | 82.11128 | 9.770 | | | |
| 43 | −446.16003 | 2.450 | 1.80100 | 34.97 | 0.58642 |
| 44 | 49.37100 | 16.950 | 1.80518 | 25.43 | 0.61027 |
| 45 | −59.80055 | 1.650 | | | |
| 46 | −37.24000 | 1.800 | 1.77250 | 49.60 | 0.55212 |
| 47 | 37.24000 | 8.700 | 1.53172 | 48.84 | 0.56309 |
| 48 | −74.93557 | 0.120 | | | |
| 49 | −195.94504 | 3.160 | 1.56732 | 42.82 | 0.57309 |
| 50 | −78.43840 | 8.510 | | | |
| 51 | −59.29837 | 4.280 | 1.54814 | 45.78 | 0.56859 |
| 52 | −33.89154 | 0.580 | | | |
| 53 | −925.12829 | 9.190 | 2.00069 | 25.46 | 0.61364 |
| 54 | 53.62076 | 1.220 | | | |
| 55 | 40.81294 | 11.260 | 1.53172 | 48.84 | 0.56309 |
| 56 | −40.81294 | 0.120 | | | |
| 57 | 78.01863 | 7.680 | 1.59551 | 39.24 | 0.58043 |
| 58 | −30.20900 | 2.100 | 2.00069 | 25.46 | 0.61364 |
| 59 | −150.40026 | 0.250 | | | |
| 60 | ∞ | 1.000 | 1.51633 | 64.14 | 0.53531 |
| 61 | ∞ | 11.372 | | | |
| 62 | ∞ | 33.000 | 1.60859 | 46.44 | 0.56664 |
| 63 | ∞ | 13.200 | 1.51633 | 64.05 | 0.53463 |
| 64 | ∞ | 5.510 | | | |

TABLE 2

Example 1

| | WIDE | MIDDLE | TELE |
|---|---|---|---|
| Zr | 1.0 | 52.0 | 120.6 |
| f | 8.291 | 431.295 | 1000.085 |
| Bf | 47.012 | 47.012 | 47.012 |
| FNo. | 1.76 | 2.23 | 5.17 |
| ω (°) | 69.8 | 1.4 | 0.6 |
| DD[12] | 2.723 | 173.316 | 179.393 |
| DD[23] | 295.478 | 41.801 | 2.937 |
| DD[28] | 2.496 | 12.215 | 4.223 |
| DD[35] | 2.318 | 75.685 | 116.462 |

TABLE 3

Example 1

| Sn | 13 | 25 | 31 |
|---|---|---|---|
| KA | 1.0000000E+00 | 1.0000000E+00 | 1.0000000E+00 |
| A3 | 3.3484999E−07 | 1.4341034E−09 | −2.4837372E−09 |
| A4 | 3.4708539E−07 | 1.0726671E−07 | −2.3796633E−07 |
| A5 | 1.7815640E−07 | −5.4598300E−09 | −1.1625905E−08 |
| A6 | −4.5054058E−08 | 4.5446725E−10 | 1.0618218E−09 |
| A7 | 6.7040497E−09 | −1.1808220E−11 | −3.9021456E−11 |
| A8 | −5.9737791E−10 | 7.9933403E−14 | 3.6579030E−13 |
| A9 | 3.4501013E−11 | −9.1511307E−15 | 2.2388337E−15 |
| A10 | −1.7034215E−12 | 3.7107919E−16 | 2.8939265E−16 |
| A11 | 9.6957627E−14 | 5.5308506E−18 | −5.6245445E−18 |
| A12 | −4.4624137E−15 | −2.9574739E−19 | −1.6931128E−19 |
| A13 | 8.3632689E−17 | −2.3635232E−21 | 2.2430720E−21 |
| A14 | 2.0291266E−18 | 1.2147121E−22 | 5.3204928E−23 |
| A15 | −1.1813140E−19 | 3.7765063E−25 | −3.5010780E−25 |
| A16 | 1.5090915E−21 | −1.9548099E−26 | −6.9906878E−27 |

Figure 3:
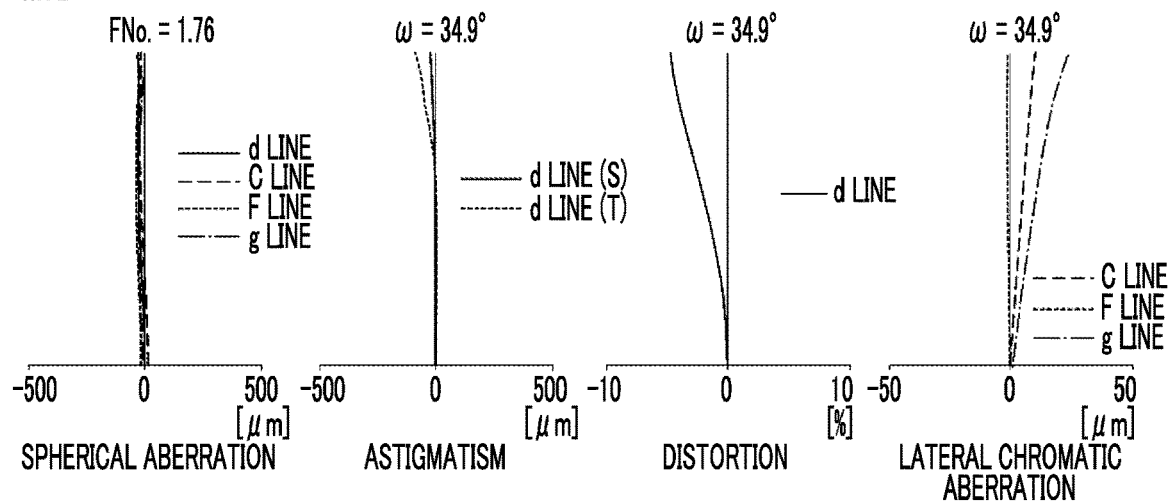
FIG. 3 is each aberration diagram of the zoom lens of Example 1 of the present disclosure.
Figure 3:
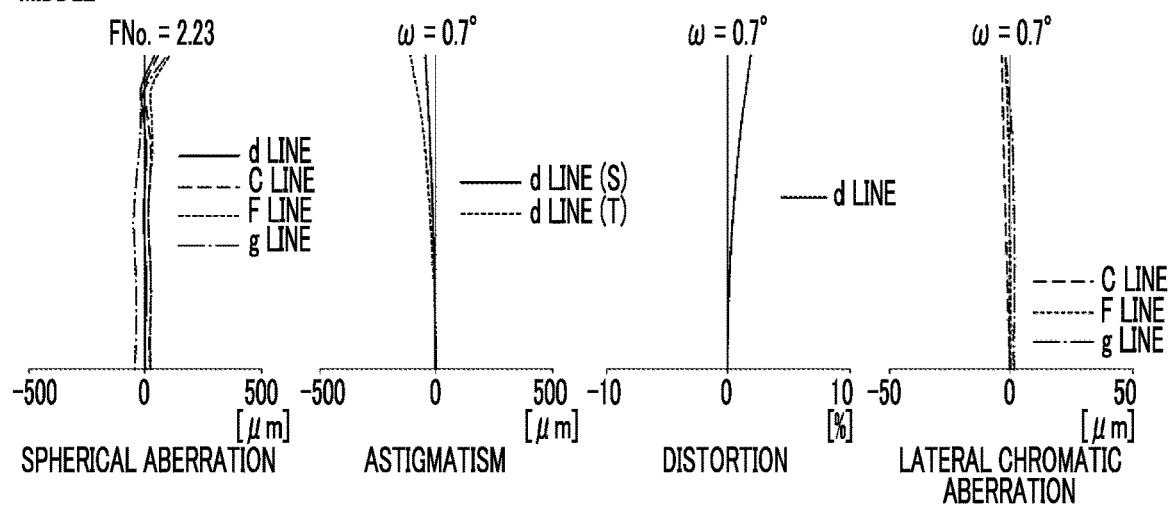
Figure 3:
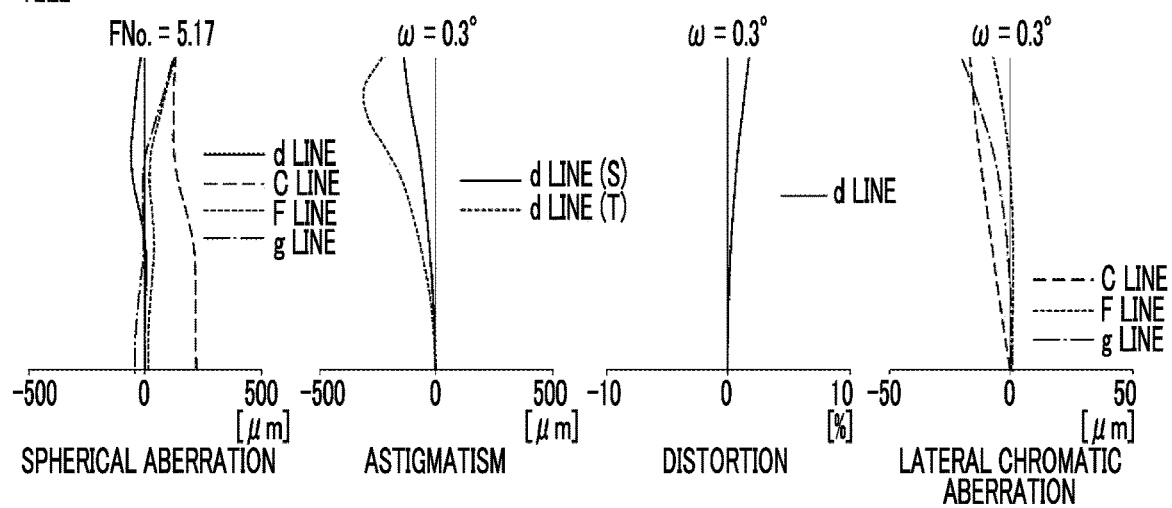

FIG. 3 illustrates each aberration diagram of the zoom lens of Example 1 in a state where the object at infinity is focused. In FIG. 3, in order from the left, spherical aberration, astigmatism, distortion, and lateral chromatic aberration are illustrated. In FIG. 3, aberration in the wide angle end state is illustrated in an upper part denoted by "WIDE", aberration in the middle focal length state is illustrated in a middle part denoted by "MIDDLE", and aberration in the telephoto end state is illustrated in a lower part denoted by "TELE". In the spherical aberration diagram, a solid line, a long broken line, a short broken line, and a one-dot chain line illustrate aberration on d line, C line, F line, and g line, respectively. In the astigmatism diagram, a solid line illustrates aberration on d line in a sagittal direction, and a short broken line illustrates aberration on d line in a tangential direction. In the distortion diagram, a solid line illustrates aberration on d line. In the lateral chromatic aberration diagram, a long broken line, a short broken line, and a one-dot chain line illustrate aberration on C line, F line, and g line, respectively. In the spherical aberration diagram, FNo. means the F number. In other aberration diagrams, tω means a half angle of view.

Symbols, meanings, writing methods, and illustration methods of each data related to Example 1 are the same in the following examples unless otherwise specified. Thus, duplicate descriptions will be omitted below.

Example 2

Figure 4:
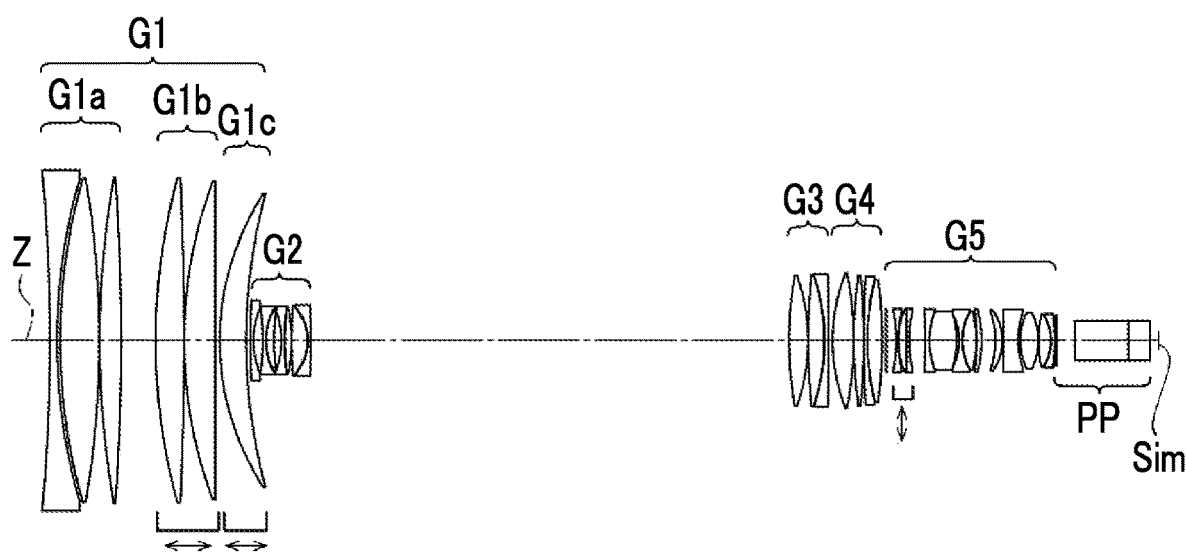
FIG. 4 is a diagram illustrating a cross-sectional view of a configuration and a movement trajectory of a zoom lens of Example 2 of the present disclosure.
Figure 4:
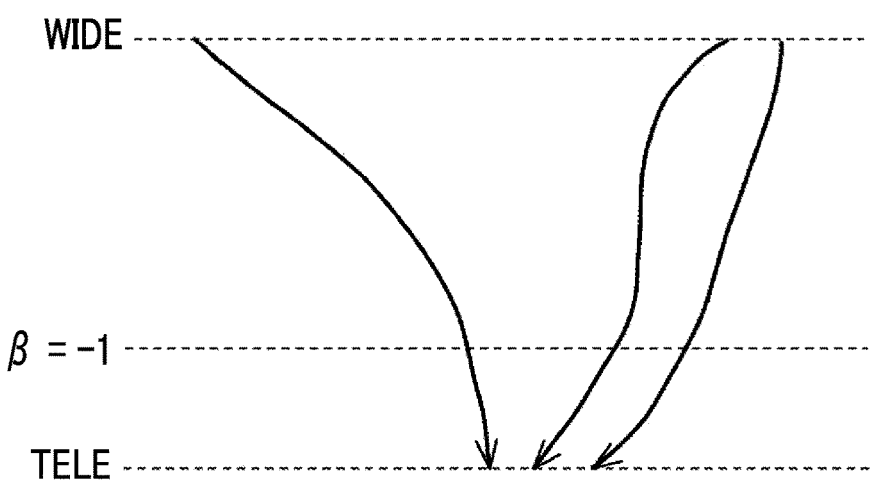
Figure 5:
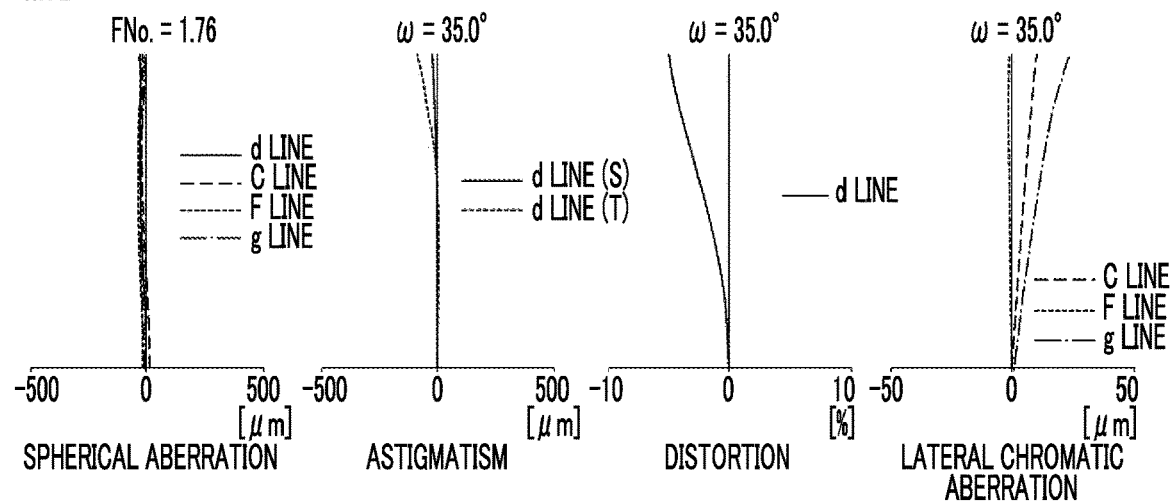
FIG. 5 is each aberration diagram of the zoom lens of Example 2 of the present disclosure.
Figure 5:
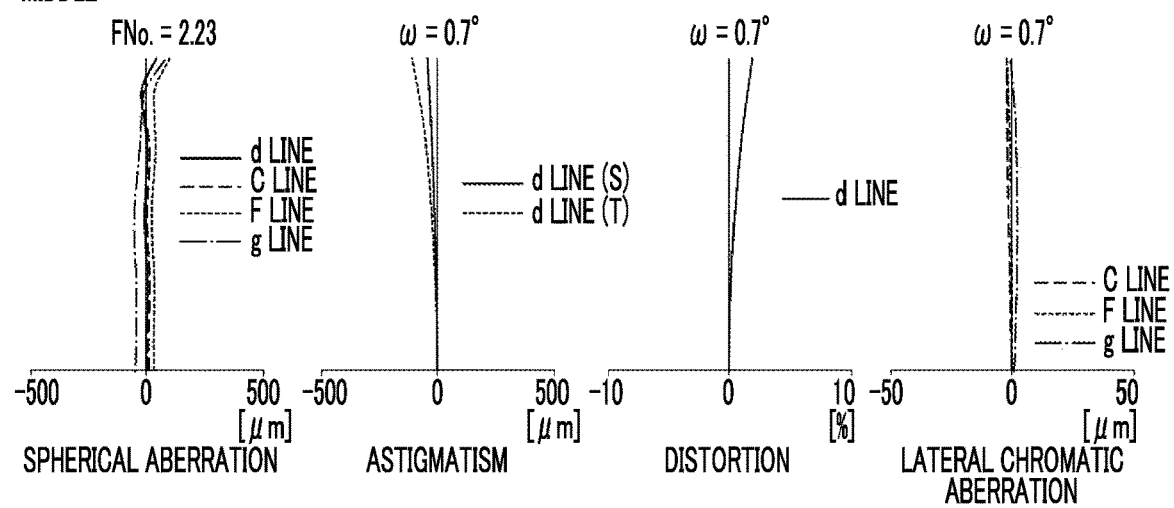
Figure 5:
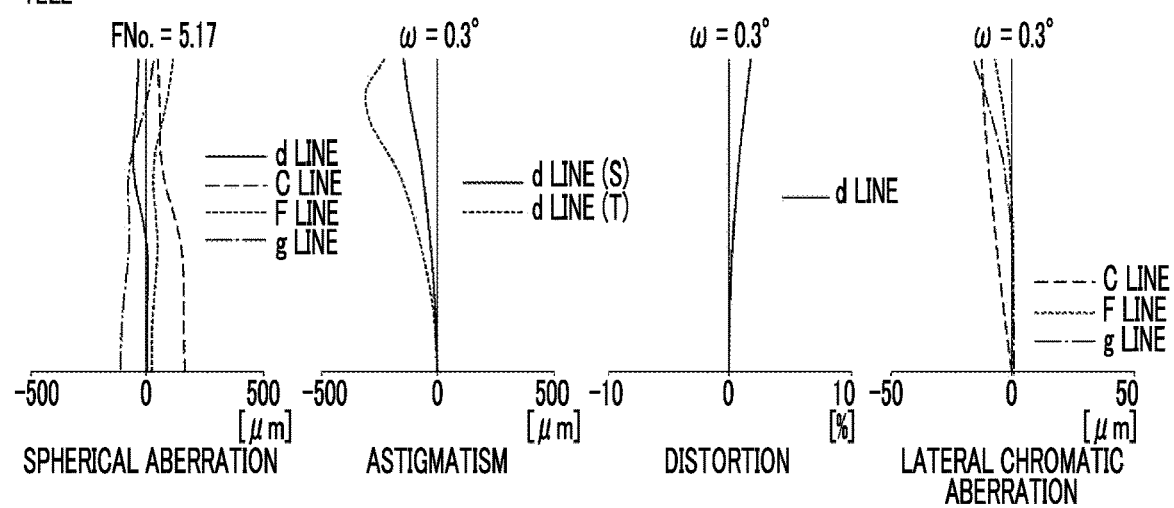

A configuration and a movement trajectory of a zoom lens of Example 2 are illustrated in FIG. 4. The zoom lens of Example 2 has the same configuration as the summary of the zoom lens of Example 1. For the zoom lens of Example 2, fundamental lens data is shown in Table 4A and Table 4B, specifications and variable surface intervals are shown in Table 5, aspherical coefficients are shown in Table 6, and each aberration diagram is illustrated in FIG. 5.

TABLE 4A

Example 2

| Sn | R | D | Nd | vd | θgF |
|---|---|---|---|---|---|
| 1 | −1187.78403 | 4.400 | 1.83501 | 43.13 | 0.56293 |
| 2 | 375.54481 | 2.000 | | | |
| 3 | 380.21694 | 24.100 | 1.43387 | 95.18 | 0.53733 |
| 4 | −618.17093 | 0.120 | | | |
| 5 | 587.88779 | 13.348 | 1.43387 | 95.18 | 0.53733 |
| 6 | −1479.78944 | 21.298 | | | |
| 7 | 397.82458 | 17.474 | 1.43387 | 95.18 | 0.53733 |
| 8 | −2309.01385 | 0.120 | | | |
| 9 | 295.70296 | 19.065 | 1.43700 | 95.10 | 0.53364 |
| 10 | 197056.58783 | 2.899 | | | |
| 11 | 172.59872 | 16.214 | 1.43700 | 95.10 | 0.53364 |
| 12 | 363.10350 | DD[12] | | | |
| *13 | 935.98696 | 1.800 | 1.90366 | 31.31 | 0.59481 |
| 14 | 50.73223 | 6.010 | | | |
| 15 | −135.10191 | 1.800 | 1.87070 | 40.73 | 0.56825 |
| 16 | 40.80800 | 4.960 | 1.43700 | 95.10 | 0.53364 |
| 17 | 150.59356 | 4.690 | | | |
| 18 | −53.04330 | 1.800 | 1.89800 | 34.00 | 0.58703 |
| 19 | 136.79400 | 4.720 | 1.89286 | 20.36 | 0.63944 |
| 20 | −96.87418 | 0.140 | | | |
| 21 | 440.21414 | 9.390 | 1.80518 | 25.45 | 0.61571 |
| 22 | −34.56000 | 1.820 | 1.80400 | 46.53 | 0.55775 |
| 23 | −572.90804 | DD[23] | | | |
| 24 | 246.87583 | 11.640 | 1.49700 | 81.54 | 0.53748 |
| *25 | −123.60927 | 0.120 | | | |
| 26 | 416.68258 | 10.110 | 1.43700 | 95.10 | 0.53364 |
| 27 | −127.84400 | 2.520 | 1.59270 | 35.27 | 0.59363 |
| 28 | −1862.36878 | DD[28] | | | |
| 29 | 120.01989 | 12.810 | 1.43700 | 95.10 | 0.53364 |
| 30 | −225.91503 | 0.120 | | | |
| *31 | 239.27475 | 6.170 | 1.43700 | 95.10 | 0.53364 |
| 32 | −432.65553 | 0.230 | | | |

TABLE 4A-continued

Example 2

| Sn | R | D | Nd | vd | θgF |
|---|---|---|---|---|---|
| 33 | 884.55488 | 2.410 | 1.85883 | 30.00 | 0.59793 |
| 34 | 162.55600 | 9.050 | 1.43700 | 95.10 | 0.53364 |
| 35 | −316.46190 | DD[35] | | | |

TABLE 4B

Example 2

| Sn | R | D | Nd | vd | θgF |
|---|---|---|---|---|---|
| 36 (St) | ∞ | 5.740 | | | |
| 37 | −109.60235 | 1.300 | 1.80100 | 34.97 | 0.58642 |
| 38 | 82.29280 | 0.120 | | | |
| 39 | 49.51289 | 4.610 | 1.84666 | 23.78 | 0.61923 |
| 40 | 354.30763 | 0.860 | | | |
| 41 | −531.15341 | 1.300 | 1.64000 | 60.08 | 0.53704 |
| 42 | 82.11128 | 9.770 | | | |
| 43 | −446.16003 | 2.450 | 1.80100 | 34.97 | 0.58642 |
| 44 | 49.37100 | 16.950 | 1.80518 | 25.43 | 0.61027 |
| 45 | −59.80055 | 1.650 | | | |
| 46 | −37.24000 | 1.800 | 1.77250 | 49.60 | 0.55212 |
| 47 | 37.24000 | 8.700 | 1.53172 | 48.84 | 0.56309 |
| 48 | −74.93557 | 0.120 | | | |
| 49 | −195.94504 | 3.160 | 1.56732 | 42.82 | 0.57309 |
| 50 | −78.43840 | 8.510 | | | |
| 51 | −59.29837 | 4.280 | 1.54814 | 45.78 | 0.56859 |
| 52 | −33.89154 | 0.580 | | | |
| 53 | −925.12829 | 9.190 | 2.00069 | 25.46 | 0.61364 |
| 54 | 53.62076 | 1.220 | | | |
| 55 | 40.81294 | 11.260 | 1.53172 | 48.84 | 0.56309 |
| 56 | −40.81294 | 0.120 | | | |
| 57 | 78.01863 | 7.680 | 1.59551 | 39.24 | 0.58043 |
| 58 | −30.20900 | 2.100 | 2.00069 | 25.46 | 0.61364 |
| 59 | −150.40026 | 0.250 | | | |
| 60 | ∞ | 1.000 | 1.51633 | 64.14 | 0.53531 |
| 61 | ∞ | 11.372 | | | |
| 62 | ∞ | 33.000 | 1.60859 | 46.44 | 0.56664 |
| 63 | ∞ | 13.200 | 1.51633 | 64.05 | 0.53463 |
| 64 | ∞ | 5.510 | | | |

TABLE 5

Example 2

| | WIDE | MIDDLE | TELE |
|---|---|---|---|
| Zr | 1.0 | 52.0 | 120.6 |
| f | 8.266 | 430.006 | 997.096 |
| Bf | 47.012 | 47.012 | 47.012 |
| FNo. | 1.76 | 2.23 | 5.17 |
| 2ω (°) | 70.0 | 1.4 | 0.6 |
| DD[12] | 2.617 | 173.211 | 179.288 |
| DD[23] | 295.480 | 41.801 | 2.938 |
| DD[28] | 2.496 | 12.215 | 4.223 |
| DD[35] | 2.318 | 75.684 | 116.461 |

TABLE 6

Example 2

| Sn | 13 | 25 | 31 |
|---|---|---|---|
| KA | 1.0000000E+00 | 1.0000000E+00 | 1.0000000E+00 |
| A3 | 3.3484999E−07 | 1.4341034E−09 | −2.4837372E−09 |
| A4 | 3.4708539E−07 | 1.0726671E−07 | −2.3796633E−07 |
| A5 | 1.7815640E−07 | −5.4598300E−09 | −1.1625905E−08 |
| A6 | −4.5054058E−08 | 4.5446725E−10 | 1.0618218E−09 |
| A7 | 6.7040497E−09 | −1.1808220E−11 | −3.9021456E−11 |
| A8 | −5.9737791E−10 | 7.9933403E−14 | 3.6579030E−13 |

TABLE 6-continued

Example 2

| Sn | 13 | 25 | 31 |
|---|---|---|---|
| A9  | 3.4501013E−11  | −9.1511307E−15 | 2.2388337E−15 |
| A10 | −1.7034215E−12 | 3.7107919E−16  | 2.8939265E−16 |
| A11 | 9.6957627E−14  | 5.5308506E−18  | −5.6245445E−18 |
| A12 | −4.4624137E−15 | −2.9574739E−19 | −1.6931128E−19 |
| A13 | 8.3632689E−17  | −2.3635232E−21 | 2.2430720E−21 |
| A14 | 2.0291266E−18  | 1.2147121E−22  | 5.3204136E−23 |
| A15 | −1.1813140E−19 | 3.7765063E−25  | −3.5010780E−25 |
| A16 | 1.5090915E−21  | −1.9548099E−26 | −6.9906878E−27 |

Example 3

Figure 6:
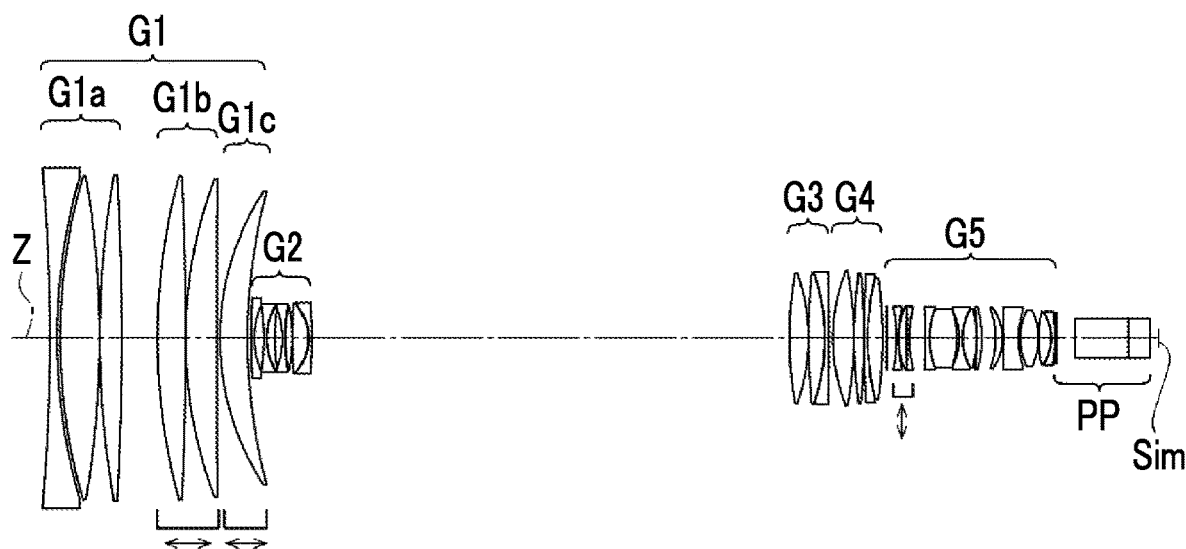
FIG. 6 is a diagram illustrating a cross-sectional view of a configuration and a movement trajectory of a zoom lens of Example 3 of the present disclosure.
Figure 6:
Figure 7:
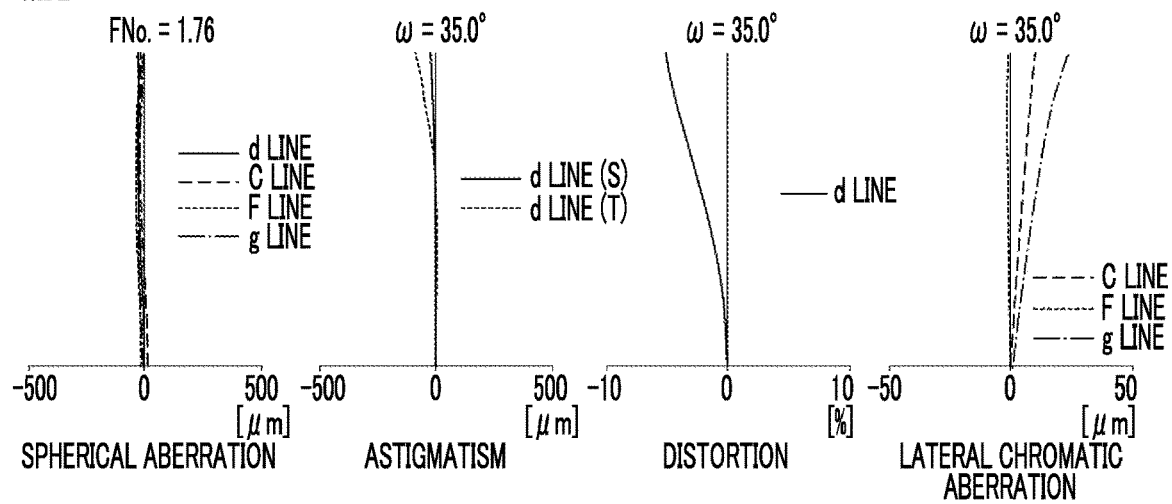
FIG. 7 is each aberration diagram of the zoom lens of Example 3 of the present disclosure.
Figure 7:
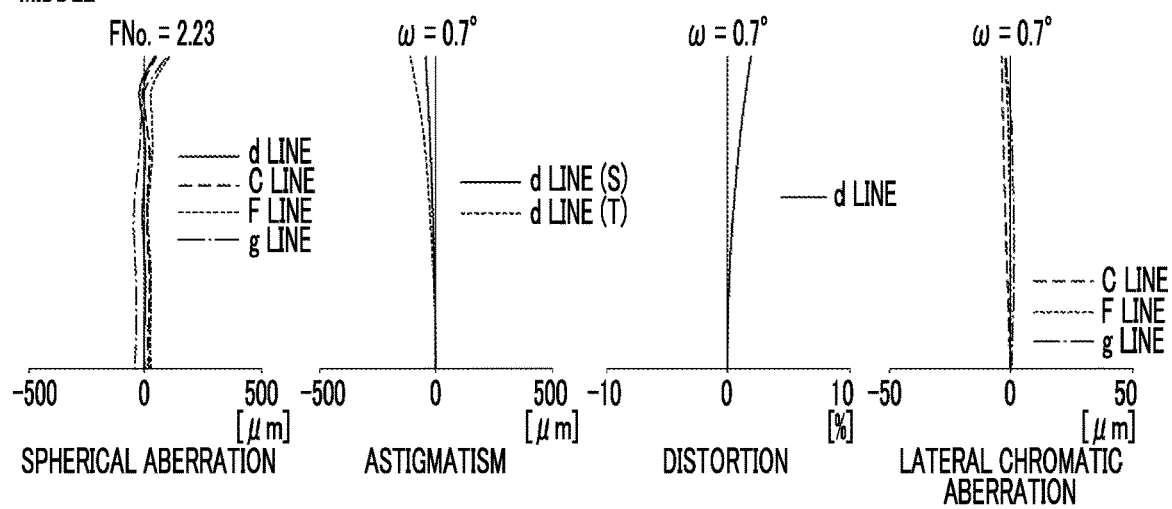
Figure 7:
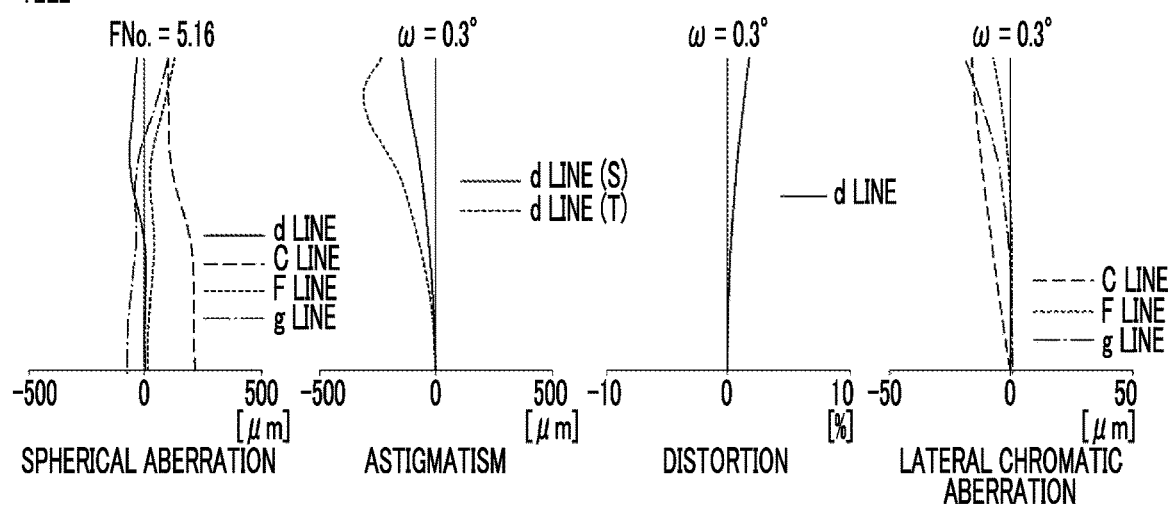

A configuration and a movement trajectory of a zoom lens of Example 3 are illustrated in FIG. 6. The zoom lens of Example 3 has the same configuration as the summary of the zoom lens of Example 1. For the zoom lens of Example 3, fundamental lens data is shown in Table 7A and Table 7B, specifications and variable surface intervals are shown in Table 8, aspherical coefficients are shown in Table 9, and each aberration diagram is illustrated in FIG. 7.

TABLE 7A

Example 3

| Sn | R | D | Nd | vd | θgF |
|---|---|---|---|---|---|
| 1   | −1245.02323 | 4.400   | 1.82080 | 42.71 | 0.56428 |
| 2   | 372.93770   | 2.000   |         |       |         |
| 3   | 377.38725   | 24.257  | 1.43387 | 95.18 | 0.53733 |
| 4   | −615.67471  | 0.120   |         |       |         |
| 5   | 595.53437   | 13.630  | 1.43387 | 95.18 | 0.53733 |
| 6   | −1889.44334 | 22.013  |         |       |         |
| 7   | 397.68830   | 17.340  | 1.43387 | 95.18 | 0.53733 |
| 8   | −2301.65601 | 0.120   |         |       |         |
| 9   | 292.28035   | 19.200  | 1.43700 | 95.10 | 0.53364 |
| 10  | 23938.43623 | 2.008   |         |       |         |
| 11  | 173.47658   | 16.940  | 1.43700 | 95.10 | 0.53364 |
| 12  | 365.55314   | DD[12]  |         |       |         |
| *13 | 935.98696   | 1.800   | 1.90366 | 31.31 | 0.59481 |
| 14  | 50.73223    | 6.010   |         |       |         |
| 15  | −135.10191  | 1.800   | 1.87070 | 40.73 | 0.56825 |
| 16  | 40.80800    | 4.960   | 1.43700 | 95.10 | 0.53364 |
| 17  | 150.59356   | 4.690   |         |       |         |
| 18  | −53.04330   | 1.800   | 1.89800 | 34.00 | 0.58703 |
| 19  | 136.79400   | 4.720   | 1.89286 | 20.36 | 0.63944 |
| 20  | −96.87418   | 0.140   |         |       |         |
| 21  | 440.21414   | 9.390   | 1.80518 | 25.45 | 0.61571 |
| 22  | −34.56000   | 1.820   | 1.80400 | 46.53 | 0.55775 |
| 23  | −572.90804  | DD[23]  |         |       |         |
| 24  | 246.87583   | 11.640  | 1.49700 | 81.54 | 0.53748 |
| *25 | −123.60927  | 0.120   |         |       |         |
| 26  | 416.68258   | 10.110  | 1.43700 | 95.10 | 0.53364 |
| 27  | −127.84400  | 2.520   | 1.59270 | 35.27 | 0.59363 |
| 28  | −1862.36878 | DD[28]  |         |       |         |
| 29  | 120.01989   | 12.810  | 1.43700 | 95.10 | 0.53364 |
| 30  | −225.91503  | 0.120   |         |       |         |
| *31 | 239.27475   | 6.170   | 1.43700 | 95.10 | 0.53364 |
| 32  | −432.65553  | 0.230   |         |       |         |
| 33  | 884.55488   | 2.410   | 1.85883 | 30.00 | 0.59793 |
| 34  | 162.55600   | 9.050   | 1.43700 | 95.10 | 0.53364 |
| 35  | −316.46190  | DD[35]  |         |       |         |

TABLE 7B

Example 3

| Sn | R | D | Nd | vd | θgF |
|---|---|---|---|---|---|
| 36 (St) | ∞          | 5.740  |         |       |         |
| 37 | −109.60235  | 1.300  | 1.80100 | 34.97 | 0.58642 |
| 38 | 82.29280    | 0.120  |         |       |         |
| 39 | 49.51289    | 4.610  | 1.84666 | 23.78 | 0.61923 |
| 40 | 354.30763   | 0.860  |         |       |         |
| 41 | −531.15341  | 1.300  | 1.64000 | 60.08 | 0.53704 |
| 42 | 82.11128    | 9.770  |         |       |         |
| 43 | −446.16003  | 2.450  | 1.80100 | 34.97 | 0.58642 |
| 44 | 49.37100    | 16.950 | 1.80518 | 25.43 | 0.61027 |
| 45 | −59.80055   | 1.650  |         |       |         |
| 46 | −37.24000   | 1.800  | 1.77250 | 49.60 | 0.55212 |
| 47 | 37.24000    | 8.700  | 1.53172 | 48.84 | 0.56309 |
| 48 | −74.93557   | 0.120  |         |       |         |
| 49 | −195.94504  | 3.160  | 1.56732 | 42.82 | 0.57309 |
| 50 | −78.43840   | 8.510  |         |       |         |
| 51 | −59.29837   | 4.280  | 1.54814 | 45.78 | 0.56859 |
| 52 | −33.89154   | 0.580  |         |       |         |
| 53 | −925.12829  | 9.190  | 2.00069 | 25.46 | 0.61364 |
| 54 | 53.62076    | 1.220  |         |       |         |
| 55 | 40.81294    | 11.260 | 1.53172 | 48.84 | 0.56309 |
| 56 | −40.81294   | 0.120  |         |       |         |
| 57 | 78.01863    | 7.680  | 1.59551 | 39.24 | 0.58043 |
| 58 | −30.20900   | 2.100  | 2.00069 | 25.46 | 0.61364 |
| 59 | −150.40026  | 0.250  |         |       |         |
| 60 | ∞           | 1.000  | 1.51633 | 64.14 | 0.53531 |
| 61 | ∞           | 11.372 |         |       |         |
| 62 | ∞           | 33.000 | 1.60859 | 46.44 | 0.56664 |
| 63 | ∞           | 13.200 | 1.51633 | 64.05 | 0.53463 |
| 64 | ∞           | 5.510  |         |       |         |

TABLE 8

Example 3

|    | WIDE   | MIDDLE  | TELE    |
|---|---|---|---|
| Zr     | 1.0     | 52.0    | 120.6   |
| f      | 8.274   | 430.423 | 998.061 |
| Bf     | 47.012  | 47.012  | 47.012  |
| FNo.   | 1.76    | 2.23    | 5.16    |
| ω (°)  | 70.0    | 1.4     | 0.6     |
| DD[12] | 2.312   | 172.906 | 178.984 |
| DD[23] | 295.480 | 41.801  | 2.938   |
| DD[28] | 2.496   | 12.215  | 4.223   |
| DD[35] | 2.318   | 75.684  | 116.461 |

TABLE 9

Example 3

| Sn | 13 | 25 | 31 |
|---|---|---|---|
| KA  | 1.0000000E+00  | 1.0000000E+00  | 1.0000000E+00 |
| A3  | 3.3484999E−07  | 1.4341034E−09  | −2.4837372E−09 |
| A4  | 3.4708539E−07  | 1.0726671E−07  | −2.3796633E−07 |
| A5  | 1.7815640E−07  | −5.4598300E−09 | −1.1625905E−08 |
| A6  | −4.5054058E−08 | 4.5446725E−10  | 1.0618218E−09 |
| A7  | 6.7040497E−09  | −1.1808220E−11 | −3.9021456E−11 |
| A8  | −5.9737791E−10 | 7.9933403E−14  | 3.6579030E−13 |
| A9  | 3.4501013E−11  | −9.1511307E−15 | 2.2388337E−15 |
| A10 | −1.7034215E−12 | 3.7107919E−16  | 2.8939265E−16 |
| A11 | 9.6957627E−14  | 5.5308506E−18  | −5.6245445E−18 |
| A12 | −4.4624137E−15 | −2.9574739E−19 | −1.6931128E−19 |
| A13 | 8.3632689E−17  | −2.3635232E−21 | 2.2430720E−21 |
| A14 | 2.0291266E−18  | 1.2147121E−22  | 5.3204136E−23 |
| A15 | −1.1813140E−19 | 3.7765063E−25  | −3.5010780E−25 |
| A16 | 1.5090915E−21  | −1.9548099E−26 | −6.9906878E−27 |

Example 4

Figure 8:
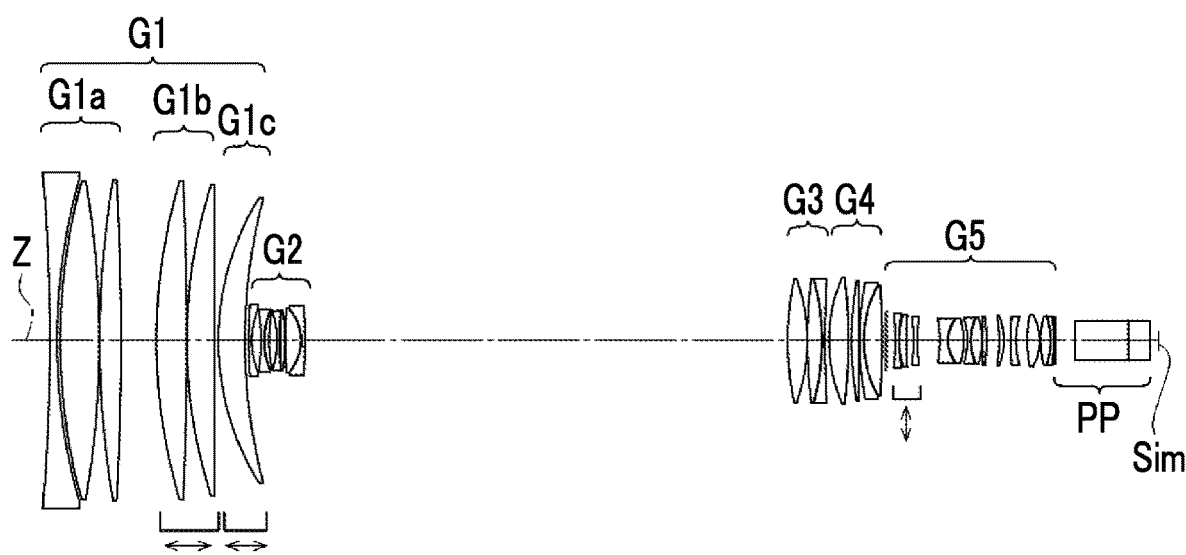
FIG. 8 is a diagram illustrating a cross-sectional view of a configuration and a movement trajectory of a zoom lens of Example 4 of the present disclosure.
Figure 8:
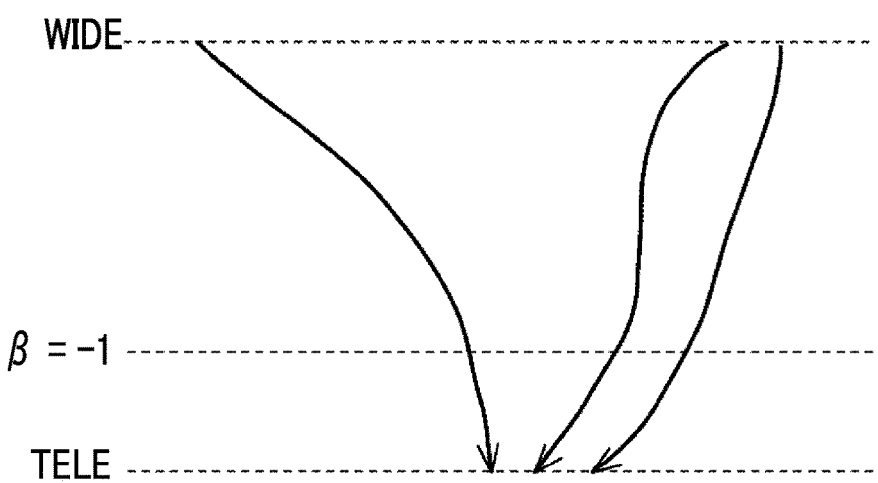
Figure 9:
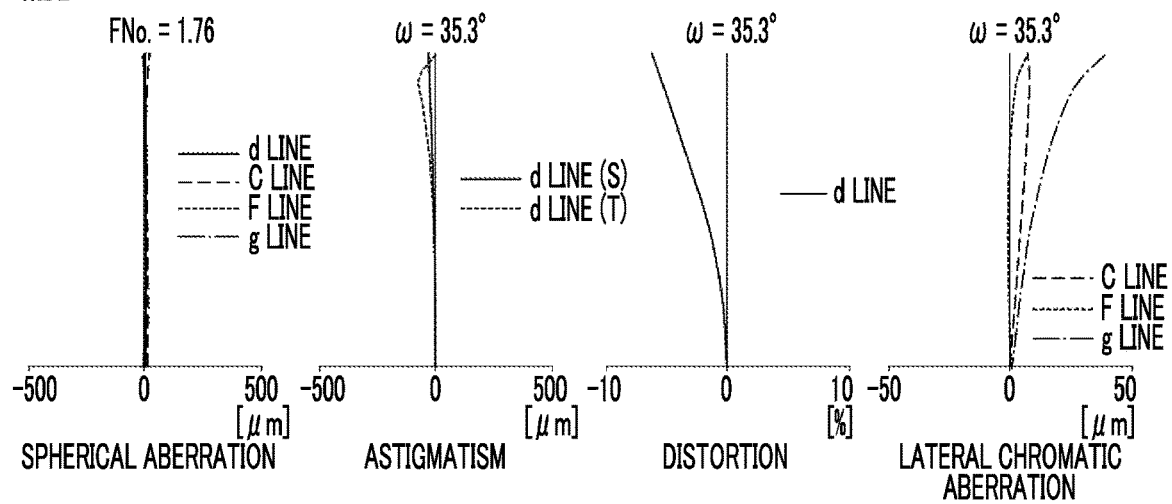
FIG. 9 is each aberration diagram of the zoom lens of Example 4 of the present disclosure.
Figure 9:
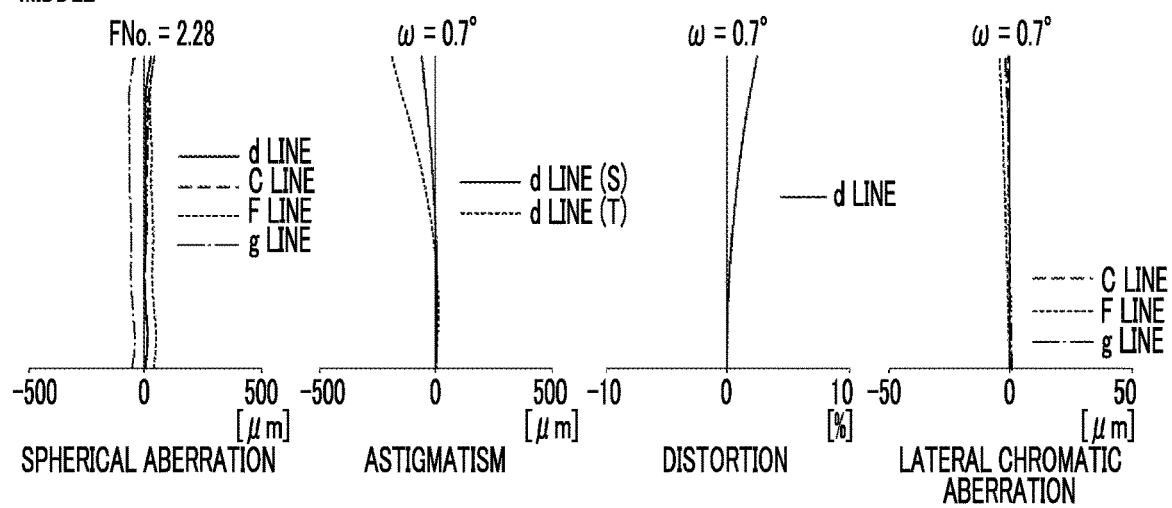
Figure 9:
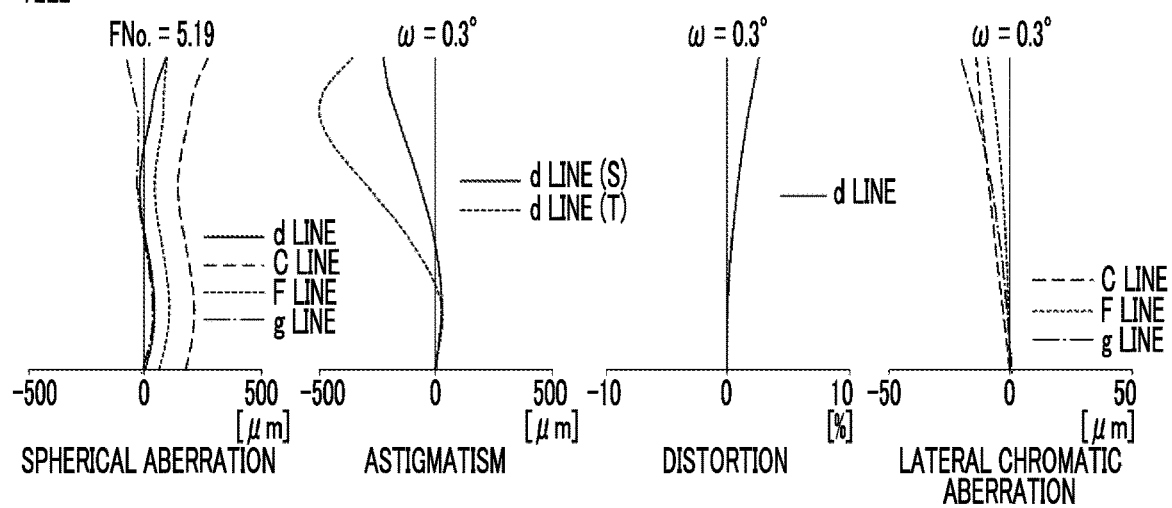

A configuration and a movement trajectory of a zoom lens of Example 4 are illustrated in FIG. 8. The zoom lens of Example 4 has the same configuration as the summary of the zoom lens of Example 1. For the zoom lens of Example 4, fundamental lens data is shown in Table 10A and Table 10B, specifications and variable surface intervals are shown in Table 11, aspherical coefficients are shown in Table 12, and each aberration diagram is illustrated in FIG. 9.

TABLE 10A

Example 4

| Sn | R | D | Nd | vd | θgF |
|---|---|---|---|---|---|
| 1 | −1239.19034 | 4.400 | 1.83481 | 42.73 | 0.56481 |
| 2 | 380.05645 | 2.000 | | | |
| 3 | 386.26404 | 24.124 | 1.43387 | 95.18 | 0.53733 |
| 4 | −601.29963 | 0.120 | | | |
| 5 | 608.02172 | 13.263 | 1.43387 | 95.18 | 0.53733 |
| 6 | −1872.62739 | 21.798 | | | |
| 7 | 358.67029 | 18.776 | 1.43387 | 95.18 | 0.53733 |
| 8 | −2237.95738 | 0.120 | | | |
| 9 | 332.49770 | 16.939 | 1.43875 | 94.94 | 0.53433 |
| 10 | ∞ | 2.452 | | | |
| 11 | 173.50719 | 16.291 | 1.43875 | 94.94 | 0.53433 |
| 12 | 357.61534 | DD[12] | | | |
| *13 | 424.39839 | 1.800 | 1.90366 | 31.31 | 0.59481 |
| 14 | 52.38963 | 5.853 | | | |
| 15 | −116.44085 | 1.800 | 1.88202 | 37.22 | 0.57699 |
| 16 | 47.78232 | 3.147 | 1.41390 | 100.82 | 0.53373 |
| 17 | 94.95760 | 4.774 | | | |
| 18 | −59.16981 | 1.820 | 1.88300 | 40.76 | 0.56679 |
| 19 | 334.96263 | 3.148 | 1.89286 | 20.36 | 0.63944 |
| 20 | −125.78683 | 0.120 | | | |
| 21 | 277.97978 | 10.150 | 1.80518 | 25.42 | 0.61616 |
| 22 | −30.88388 | 1.820 | 1.80400 | 46.53 | 0.55775 |
| 23 | −500.55321 | DD[23] | | | |
| 24 | 195.90188 | 11.975 | 1.49700 | 81.54 | 0.53748 |
| *25 | −114.97949 | 0.120 | | | |
| 26 | 329.37197 | 9.093 | 1.43700 | 95.10 | 0.53364 |
| 27 | −145.76086 | 1.820 | 1.59270 | 35.31 | 0.59336 |
| 28 | 932.65551 | DD[28] | | | |
| 29 | 103.15963 | 11.901 | 1.43700 | 95.10 | 0.53364 |
| 30 | −349.92636 | 1.823 | | | |
| *31 | 196.87870 | 4.794 | 1.43700 | 95.10 | 0.53364 |
| 32 | −1451.51002 | 0.120 | | | |
| 33 | 183.06784 | 2.808 | 1.80440 | 39.59 | 0.57297 |
| 34 | 71.56684 | 11.560 | 1.43700 | 95.10 | 0.53364 |
| 35 | −565.36885 | DD[35] | | | |

TABLE 10B

Example 4

| Sn | R | D | Nd | vd | θgF |
|---|---|---|---|---|---|
| 36 (St) | ∞ | 5.210 | | | |
| 37 | −188.26185 | 2.329 | 1.80400 | 46.53 | 0.55775 |
| 38 | 86.53718 | 0.229 | | | |
| 39 | 51.18485 | 4.357 | 1.82115 | 24.06 | 0.62375 |
| 40 | 229.74627 | 4.489 | | | |
| 41 | −117.18982 | 2.332 | 1.80400 | 46.53 | 0.55775 |
| 42 | 145.94025 | 13.652 | | | |
| 43 | −107.60167 | 5.359 | 1.72916 | 54.68 | 0.54451 |
| 44 | 23.52714 | 9.390 | 1.63980 | 34.47 | 0.59233 |
| 45 | −56.12291 | 2.398 | | | |
| 46 | −46.56691 | 2.208 | 1.80400 | 46.53 | 0.55775 |
| 47 | 38.18261 | 6.744 | 1.56732 | 42.82 | 0.57309 |
| 48 | −56.57227 | 0.652 | | | |
| 49 | 582.68074 | 2.171 | 1.53996 | 59.46 | 0.54418 |
| 50 | −152.64366 | 7.820 | | | |
| 51 | −97.39642 | 3.043 | 1.48749 | 70.24 | 0.53007 |
| 52 | −42.43033 | 4.371 | | | |
| 53 | 906.89259 | 3.155 | 2.00069 | 25.46 | 0.61364 |
| 54 | 57.84531 | 6.914 | | | |
| 55 | 79.55460 | 7.696 | 1.51742 | 52.43 | 0.55649 |
| 56 | −33.67604 | 0.394 | | | |
| 57 | 59.69215 | 6.315 | 1.53172 | 48.84 | 0.56309 |
| 58 | −45.01415 | 1.827 | 2.00069 | 25.46 | 0.61364 |
| 59 | −148.92077 | 0.250 | | | |
| 60 | ∞ | 1.000 | 1.51633 | 64.14 | 0.53531 |
| 61 | ∞ | 11.881 | | | |
| 62 | ∞ | 33.000 | 1.60859 | 46.44 | 0.56664 |
| 63 | ∞ | 13.200 | 1.51633 | 64.05 | 0.53463 |
| 64 | ∞ | 5.507 | | | |

TABLE 11

Example 4

| | WIDE | MIDDLE | TELE |
|---|---|---|---|
| Zr | 1.0 | 52.0 | 120.6 |
| f | 8.296 | 431.570 | 1000.721 |
| Bf | 47.517 | 47.517 | 47.517 |
| FNo. | 1.76 | 2.28 | 5.19 |
| ω (°) | 70.6 | 1.4 | 0.6 |
| DD[12] | 2.471 | 177.070 | 183.655 |
| DD[23] | 298.378 | 42.221 | 2.934 |
| DD[28] | 2.506 | 11.973 | 6.261 |
| DD[35] | 2.287 | 74.378 | 112.792 |

TABLE 12

Example 4

| Sn | 13 | 25 | 31 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −8.0686942E−09 | 1.6978363E−07 | −2.2052654E−07 |
| A5 | 1.7936704E−07 | −1.0616213E−09 | −9.5649774E−10 |
| A6 | −4.5313864E−08 | 6.8648909E−12 | 1.2680584E−09 |
| A7 | 6.6744661E−09 | −2.7093802E−13 | −2.4120311E−10 |
| A8 | −5.9476763E−10 | −1.0263776E−14 | 1.8476191E−11 |
| A9 | 3.4585530E−11 | 2.5907942E−15 | −6.7218578E−13 |
| A10 | −1.7058528E−12 | −1.0917192E−17 | 8.3911970E−15 |
| A11 | 9.6590396E−14 | −1.9249862E−18 | 1.6586620E−16 |
| A12 | −4.4722039E−15 | −7.5647763E−20 | −6.6754225E−18 |
| A13 | 8.4109641E−17 | 6.0670620E−21 | 1.2317408E−19 |
| A14 | 2.0788554E−18 | −1.4336992E−22 | −3.5628368E−21 |
| A15 | −1.1872902E−19 | 1.7814817E−24 | 7.8153179E−23 |
| A16 | 1.4720654E−21 | −1.0855451E−26 | −6.3051619E−25 |

Example 5

Figure 10:
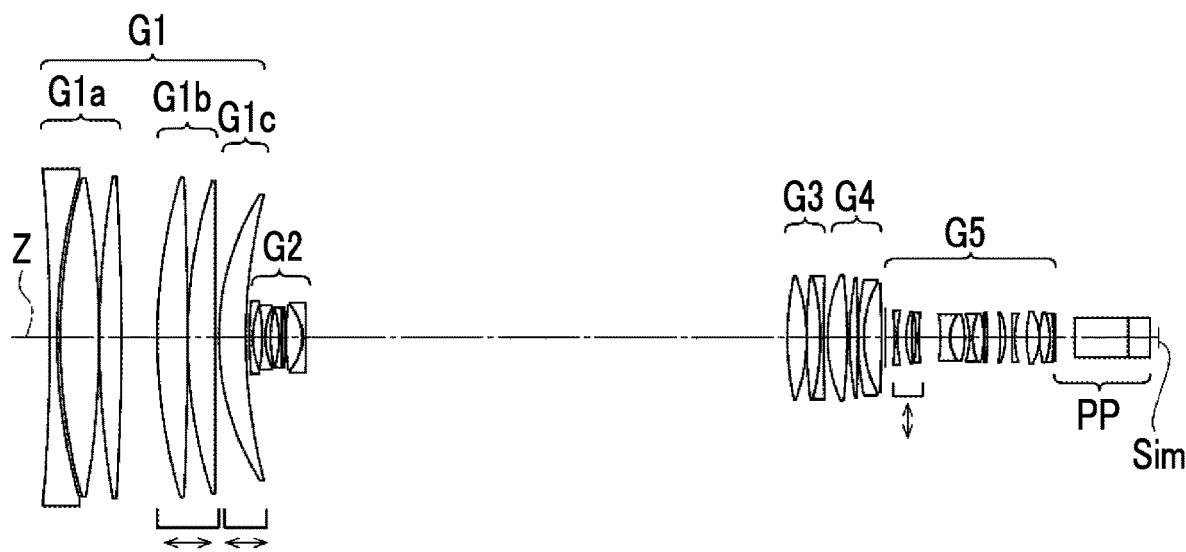
FIG. 10 is a diagram illustrating a cross-sectional view of a configuration and a movement trajectory of a zoom lens of Example 5 of the present disclosure.
Figure 10:
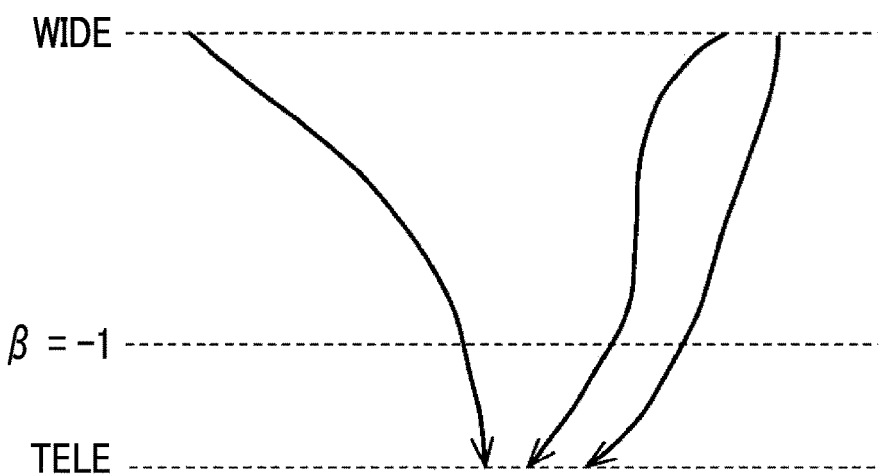
Figure 11:
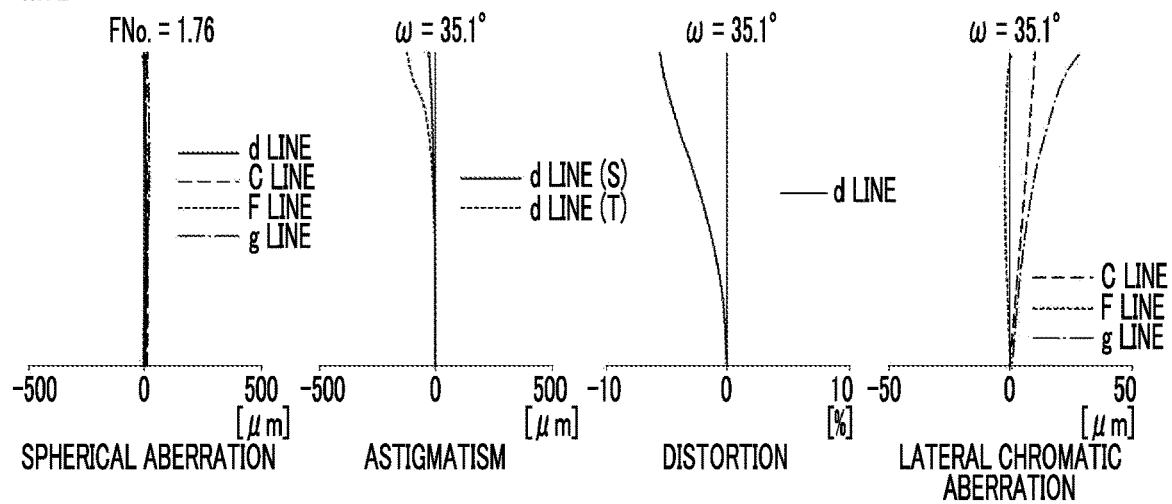
FIG. 11 is each aberration diagram of the zoom lens of Example 5 of the present disclosure.
Figure 11:
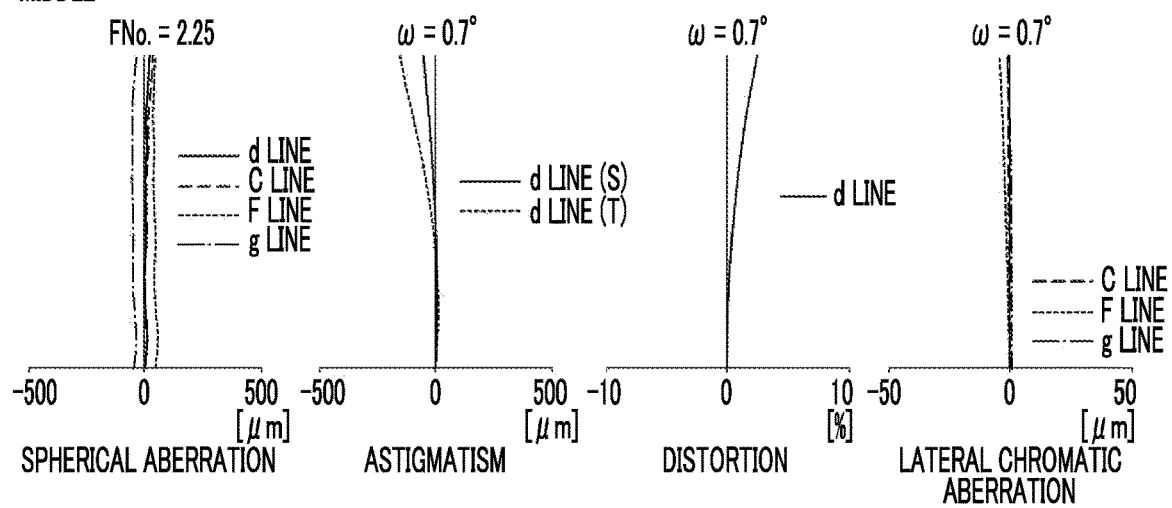
Figure 11:
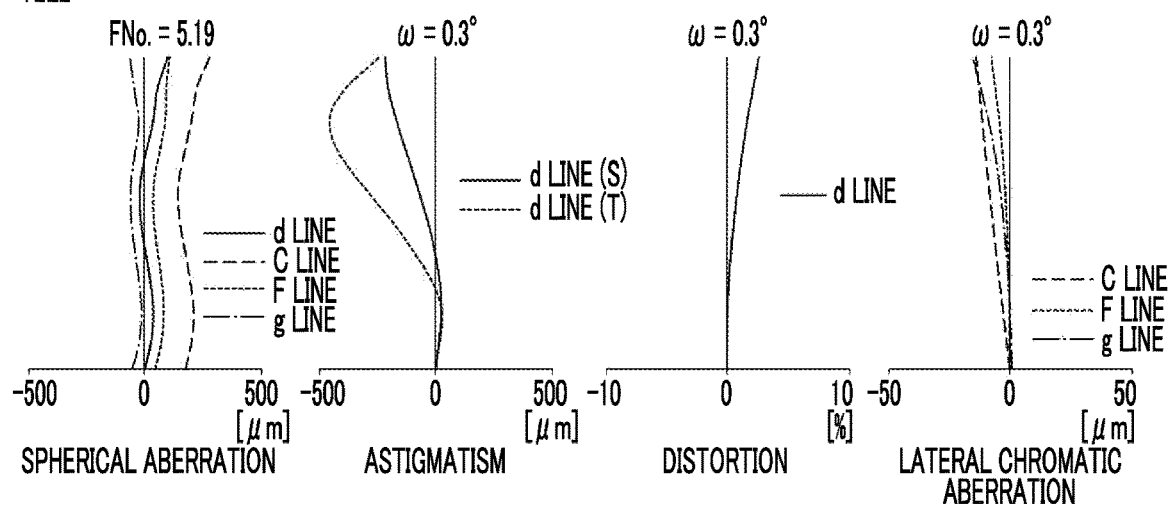

A configuration and a movement trajectory of a zoom lens of Example 5 are illustrated in FIG. 10. The zoom lens of Example 5 has the same configuration as the summary of the zoom lens of Example 1. For the zoom lens of Example 5, fundamental lens data is shown in Table 13A and Table 13B, specifications and variable surface intervals are shown in Table 14, aspherical coefficients are shown in Table 15, and each aberration diagram is illustrated in FIG. 11.

TABLE 13A

Example 5

| Sn | R | D | Nd | vd | θgF |
|---|---|---|---|---|---|
| 1 | −1247.24500 | 4.400 | 1.83481 | 42.73 | 0.56481 |
| 2 | 378.17990 | 2.000 | | | |
| 3 | 384.66501 | 23.905 | 1.43387 | 95.18 | 0.53733 |
| 4 | −620.71480 | 0.120 | | | |
| 5 | 607.95739 | 13.672 | 1.43387 | 95.18 | 0.53733 |
| 6 | −1635.54315 | 22.044 | | | |
| 7 | 357.64078 | 18.727 | 1.43387 | 95.18 | 0.53733 |
| 8 | −2323.86403 | 0.120 | | | |
| 9 | 333.52184 | 16.884 | 1.43875 | 94.94 | 0.53433 |
| 10 | ∞ | 2.271 | | | |
| 11 | 172.83587 | 16.561 | 1.43875 | 94.94 | 0.53433 |
| 12 | 362.63143 | DD[12] | | | |
| *13 | 435.75278 | 1.862 | 1.90366 | 31.31 | 0.59481 |
| 14 | 53.61935 | 5.888 | | | |
| 15 | −124.90000 | 1.800 | 1.87070 | 40.73 | 0.56825 |
| 16 | 43.07230 | 3.495 | 1.49700 | 81.61 | 0.53887 |
| 17 | 85.30127 | 5.072 | | | |
| 18 | −60.50976 | 1.820 | 1.88300 | 40.76 | 0.56679 |
| 19 | −3479.99444 | 2.391 | 1.94595 | 17.98 | 0.65460 |
| 20 | −138.69469 | 0.120 | | | |
| 21 | 217.53448 | 10.316 | 1.80518 | 25.42 | 0.61616 |
| 22 | −31.70522 | 1.820 | 1.80400 | 46.53 | 0.55775 |
| 23 | −931.64568 | DD[23] | | | |
| 24 | 197.33862 | 11.635 | 1.49700 | 81.54 | 0.53748 |
| *25 | −116.78713 | 0.120 | | | |
| 26 | 338.03978 | 8.590 | 1.43700 | 95.10 | 0.53364 |
| 27 | −154.07793 | 1.820 | 1.59270 | 35.31 | 0.59336 |
| 28 | 903.60083 | DD[28] | | | |
| 29 | 102.17632 | 12.042 | 1.43700 | 95.10 | 0.53364 |
| 30 | −357.01739 | 1.488 | | | |
| *31 | 190.97599 | 4.923 | 1.43700 | 95.10 | 0.53364 |
| 32 | −1341.73050 | 0.305 | | | |
| 33 | 183.93205 | 3.502 | 1.80440 | 39.59 | 0.57297 |
| 34 | 71.03957 | 11.361 | 1.43700 | 95.10 | 0.53364 |
| 35 | −596.98574 | DD[35] | | | |

TABLE 13B

Example 5

| Sn | R | D | Nd | vd | θgF |
|---|---|---|---|---|---|
| 36 (St) | ∞ | 5.210 | | | |
| 37 | −179.42575 | 1.800 | 1.80139 | 45.45 | 0.55814 |
| 38 | 82.74660 | 5.282 | | | |
| 39 | 49.90039 | 3.622 | 1.84666 | 23.78 | 0.61923 |
| 40 | 297.42629 | 2.442 | | | |
| 41 | −112.44053 | 1.800 | 1.80400 | 46.53 | 0.55775 |
| 42 | 136.69219 | 13.203 | | | |
| 43 | −108.07011 | 6.051 | 1.72916 | 54.09 | 0.54490 |
| 44 | 25.68443 | 8.831 | 1.63980 | 34.47 | 0.59233 |
| 45 | −54.46125 | 3.071 | | | |
| 46 | −46.99407 | 1.988 | 1.77250 | 49.60 | 0.55212 |
| 47 | 39.66945 | 6.922 | 1.54814 | 45.78 | 0.56859 |
| 48 | −55.57389 | 0.120 | | | |
| 49 | 884.41655 | 2.120 | 1.51742 | 52.43 | 0.55649 |
| 50 | −144.84593 | 7.934 | | | |
| 51 | −97.87116 | 3.030 | 1.48749 | 70.24 | 0.53007 |
| 52 | −42.84697 | 4.043 | | | |
| 53 | 1151.08531 | 1.800 | 1.96300 | 24.11 | 0.62126 |
| 54 | 57.15854 | 7.468 | | | |
| 55 | 74.21323 | 7.643 | 1.51742 | 52.43 | 0.55649 |
| 56 | −35.33831 | 0.135 | | | |
| 57 | 62.39042 | 6.337 | 1.54072 | 47.23 | 0.56511 |
| 58 | −44.23377 | 2.258 | 2.00069 | 25.46 | 0.61364 |
| 59 | −162.17197 | 0.250 | | | |
| 60 | ∞ | 1.000 | 1.51633 | 64.14 | 0.53531 |
| 61 | ∞ | 11.899 | | | |
| 62 | ∞ | 33.000 | 1.60859 | 46.44 | 0.56664 |
| 63 | ∞ | 13.200 | 1.51633 | 64.05 | 0.53463 |
| 64 | ∞ | 5.510 | | | |

TABLE 14

Example 5

| | WIDE | MIDDLE | TELE |
|---|---|---|---|
| Zr | 1.0 | 52.0 | 120.6 |
| f | 8.297 | 431.627 | 1000.855 |
| Bf | 47.539 | 47.539 | 47.539 |
| FNo. | 1.76 | 2.25 | 5.19 |
| ω (°) | 70.2 | 1.4 | 0.6 |
| DD[12] | 2.399 | 175.081 | 181.594 |
| DD[23] | 297.098 | 42.338 | 2.945 |
| DD[28] | 2.497 | 11.964 | 6.252 |
| DD[35] | 2.279 | 74.891 | 113.482 |

TABLE 15

Example 5

| Sn | 13 | 25 | 31 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | −2.0418640E−08 | 1.6774969E−07 | −2.1898905E−07 |
| A5 | 1.7997276E−07 | −8.4229260E−10 | −1.3844130E−09 |
| A6 | −4.5437887E−08 | −2.0469494E−12 | 1.2931566E−09 |
| A7 | 6.6751364E−09 | −6.4965005E−13 | −2.4165943E−10 |
| A8 | −5.9456491E−10 | 3.8125842E−15 | 1.8466846E−11 |
| A9 | 3.4600193E−11 | 2.1729178E−15 | −6.7241617E−13 |
| A10 | −1.7060286E−12 | 1.3528170E−17 | 8.4080445E−15 |
| A11 | 9.6566222E−14 | −1.6168407E−18 | 1.6635466E−16 |
| A12 | −4.4727077E−15 | −1.1639852E−19 | −6.6941235E−18 |
| A13 | 8.4045374E−17 | 6.8007151E−21 | 1.2311712E−19 |
| A14 | 2.0761838E−18 | −1.5682732E−22 | −3.5545539E−21 |
| A15 | −1.1818133E−19 | 2.2116854E−24 | 7.7910896E−23 |
| A16 | 1.4620255E−21 | −1.5630382E−26 | −6.2738171E−25 |

Table 16 shows corresponding values of Conditional Expressions (1) to (9) of the zoom lenses of Examples 1 to 5.

TABLE 16

| Expression Number | | Example 1 | Example 2 | Example 3 | Example 4 | Example 5 |
|---|---|---|---|---|---|---|
| (1) | Nd1 | 1.83481 | 1.83501 | 1.82080 | 1.83481 | 1.83481 |
| (2) | vd1 | 42.73 | 43.13 | 42.71 | 42.73 | 42.73 |
| (3) | θgF1 | 0.56481 | 0.56293 | 0.56428 | 0.56481 | 0.56481 |
| (4) | vd2p | 95.10 | 95.10 | 95.10 | 100.82 | 81.61 |
| (5) | fG1/fL1 | −0.682 | −0.695 | −0.680 | −0.696 | −0.693 |
| (6) | fG1/fG1a | 0.0009 | 0.0024 | 0.0023 | −0.0053 | −0.0030 |
| (7) | fG34t/fG2 | −3.29 | −3.29 | −3.29 | −3.14 | −3.14 |
| (8) | fG3/fG2 | −6.94 | −6.94 | −6.94 | −6.39 | −6.47 |
| (9) | fG1/fG2 | −10.12 | −10.09 | −10.10 | −10.00 | −9.92 |

As is perceived from the data described above, even in a case where the zoom lenses of Examples 1 to 5 are configured in a small size, the zoom magnification is greater than or equal to a power of 120, and a high magnification is achieved. In addition, high optical characteristics are implemented by favorably correcting various types of aberration.

Figure 12:
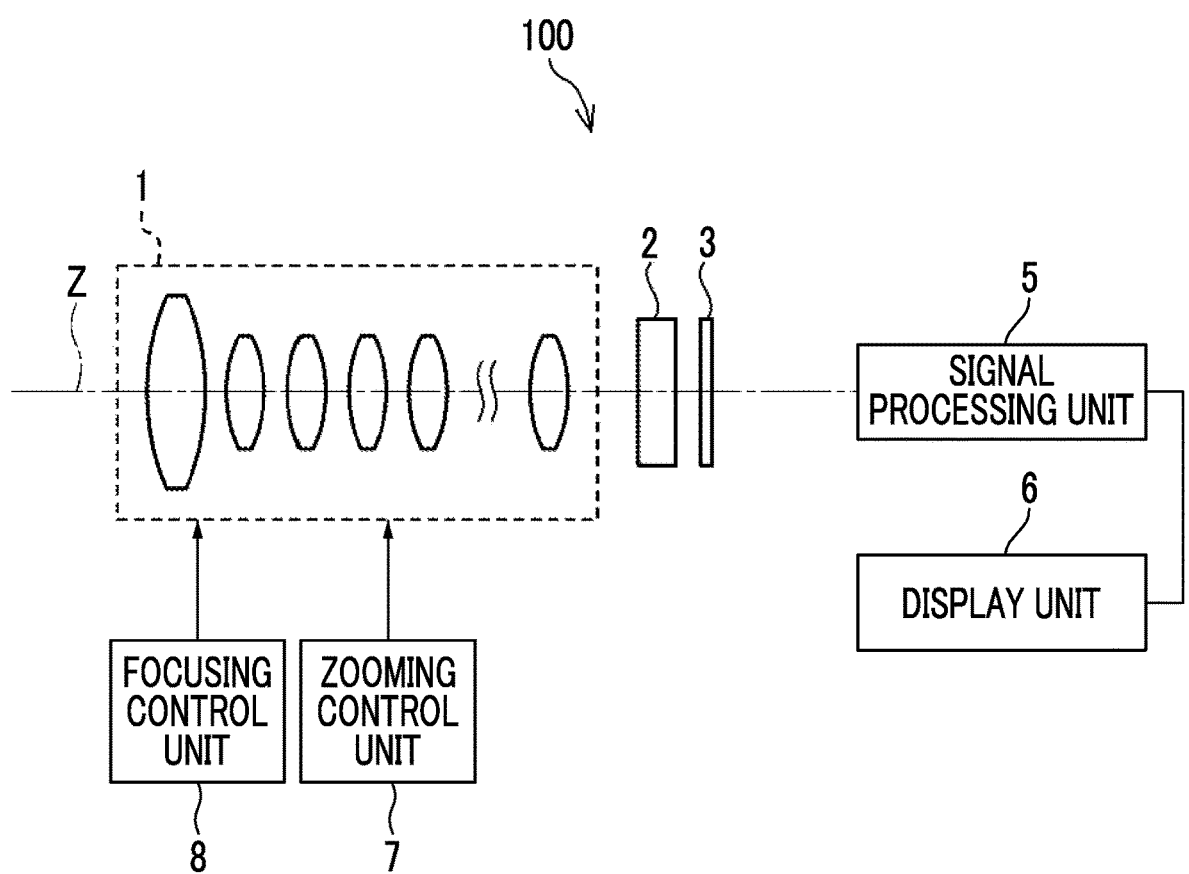
FIG. 12 is a schematic configuration diagram of an imaging apparatus according to one embodiment of the present disclosure.

Next, an imaging apparatus according to the embodiment of the present disclosure will be described. FIG. 12 illustrates a schematic configuration diagram of an imaging apparatus 100 using a zoom lens 1 according to the embodiment of the present disclosure as one example of the imaging apparatus according to the embodiment of the present disclosure. For example, a broadcasting camera, a movie imaging camera, a video camera, and a monitoring camera can be exemplified as the imaging apparatus 100.

The imaging apparatus 100 comprises the zoom lens 1, a filter 2 arranged on the image side of the zoom lens 1, and an imaging element 3 arranged on the image side of the filter 2. In FIG. 12, a plurality of lenses comprised in the zoom lens 1 are schematically illustrated.

The imaging element 3 converts an optical image formed by the zoom lens 1 into an electric signal and can use, for example, a charge coupled device (CCD) or a complementary metal oxide semiconductor (CMOS). The imaging element 3 is arranged such that an imaging surface thereof matches an image surface of the zoom lens 1.

The imaging apparatus 100 also comprises a signal processing unit 5 performing calculation processing on an output signal from the imaging element 3, a display unit 6 displaying an image formed by the signal processing unit 5, a zooming control unit 7 controlling zooming of the zoom lens 1, and a focusing control unit 8 controlling focusing of the zoom lens 1. While only one imaging element 3 is illustrated in FIG. 12, a so-called three-plate type imaging apparatus including three imaging elements may also be used.

While the technology of the present disclosure has been illustratively described with the embodiment and the examples, the technology of the present disclosure is not limited to the embodiment and the examples and can be subjected to various modifications. For example, the radius of curvature, the surface interval, the refractive index, the Abbe number, the aspherical coefficient, and the like of each lens are not limited to the values shown in each example of the numerical values and may have other values.

What is claimed is:

1. A zoom lens consisting of, in order from an object side to an image side, a first lens group that has a positive refractive power and is fixed with respect to an image surface during zooming;
a second lens group that has a negative refractive power and is moved along an optical axis during zooming;
a third lens group that has a positive refractive power and is moved along the optical axis during zooming;
a fourth lens group that has a positive refractive power and is moved along the optical axis during zooming; and
a fifth lens group that has a positive refractive power and is fixed with respect to the image surface during zooming,
wherein all intervals between adjacent lens groups are changed during zooming,
the first lens group consists of one negative lens and five positive lenses in order from the object side to the image side,
in a case where a refractive index of the negative lens of the first lens group with respect to d line is denoted by Nd1, a d line-based Abbe number of the negative lens of the first lens group is denoted by vd1, and a partial dispersion ratio of the negative lens of the first lens group between g line and F line is denoted by θgF1, Conditional Expressions (1), (2), and (3) are satisfied, which are represented by $$1.8 < Nd1 < 1.85 \tag{1}$$

$$38 < vd1 < 46 \tag{2}$$

$$0.55 < \theta gF1 < 0.58 \tag{3},$$

the second lens group includes at least one positive lens,
in a case where a maximum value of a d-line based Abbe number of all positive lenses included in the second lens group is denoted by vd2p, Conditional Expression (4) is satisfied, which is represented by $$65 < vd2p < 110 \tag{4, and}$$

the first lens group consists of, in order from the object side to the image side, a first a lens group that is fixed with respect to the image surface during focusing, a first b lens group that has a positive refractive power and is moved along the optical axis during focusing, and a first c lens group that has a positive refractive power and is moved along the optical axis by changing a mutual interval between the first b lens group and the first c lens group during focusing.

2. The zoom lens according to claim 1,
wherein in a state where an object at infinity is focused, in a case where a focal length of the first lens group is denoted by fG1, and a focal length of the negative lens of the first lens group is denoted by fL1, Conditional Expression (5) is satisfied, which is represented by $$-0.9 < fG1/fL1 < -0.65 \tag{5}.$$

3. The zoom lens according to claim 2,
wherein Conditional Expression (5-1) is satisfied, which is represented by $-0.8 < fG1/fL1 < -0.65$ (5-1).

4. The zoom lens according to claim 1,
wherein the first a lens group consists of one negative lens and two positive lenses in order from the object side to the image side,
the first b lens group consists of two positive lenses, and the first c lens group consists of one positive lens.

5. The zoom lens according to claim 1,
wherein in a state where an object at infinity is focused, in a case where a focal length of the first lens group is denoted by fG1, and a focal length of the first a lens group is denoted by fG1a, Conditional Expression (6) is satisfied, which is represented by $-0.035 < fG1/fG1a < 0.045$ (6).

6. The zoom lens according to claim 5,
wherein Conditional Expression (6-1) is satisfied, which is represented by $0.02 < fG1/fG1a < 0.02$ (6-1).

7. The zoom lens according to claim 1,
wherein during zooming from a wide angle end to a telephoto end in a state where an object at infinity is focused, a third and fourth combined lens group obtained by combining the third lens group and the fourth lens group, and the second lens group simultaneously pass through respective points at which lateral magnifications are −1, and the third lens group is moved to the object side at all times.

8. The zoom lens according to claim 7,
wherein in a state where an object at infinity is focused, in a case where a focal length of the third and fourth combined lens group at the telephoto end is denoted by fG34t, and a focal length of the second lens group is denoted by fG2, Conditional Expression (7) is satisfied, which is represented by $-4 < fG34t/fG2 < -3$ (7).

9. The zoom lens according to claim 8,
wherein Conditional Expression (7-1) is satisfied, which is represented by $-3.6 < fG34t/fG2 < -3.1$ (7-1).

10. The zoom lens according to claim 1,
wherein in a state where an object at infinity is focused, in a case where a focal length of the third lens group is denoted by fG3, and a focal length of the second lens group is denoted by fG2, Conditional Expression (8) is satisfied, which is represented by $-10 < fG3/fG2 < -4$ (8).

11. The zoom lens according to claim 10
wherein Conditional Expression (8-1) is satisfied, which is represented by $-9 < fG3/fG2 < -5$ (8-1).

12. The zoom lens according to claim 1,
wherein in a state where an object at infinity is focused, in a case where a focal length of the first lens group is denoted by fG1, and a focal length of the second lens group is denoted by fG2, Conditional Expression (9) is satisfied, which is represented by $-12 < fG1/fG2 < -8$ (9).

13. The zoom lens according to claim 1,
wherein the fifth lens group includes a vibration proof group that is moved in a direction intersecting with the optical axis during image shake correction.

14. The zoom lens according to claim 1,
wherein Conditional Expression (1-1) is satisfied, which is represented by $1.81 < Nd1 < 1.85$ (1-1).

15. The zoom lens according to claim 1,
wherein Conditional Expression (2-1) is satisfied, which is represented by $40 < vd1 < 45$ (2-1).

16. The zoom lens according to claim 1,
wherein Conditional Expression (3-1) is satisfied, which is represented by $0.55 < \theta gF1 < 0.57$ (3-1).

17. The zoom lens according to claim 1,
wherein Conditional Expression (4-1) is satisfied, which is represented by $70 < vd2p < 106$ (4-1).

18. An imaging apparatus comprising:
the zoom lens according to claim 1.

* * * * *